US012713345B2

(12) United States Patent
Helwa et al.

(10) Patent No.: US 12,713,345 B2
(45) Date of Patent: Aug. 18, 2026

(54) OVERLAPPING PHYSICAL LAYER PROTOCOL DATA UNIT END POINT OFFSET

(71) Applicant: QUALCOMM Incorporated, San Diego, CA (US)

(72) Inventors: Sherief Helwa, San Diego, CA (US); George Cherian, San Diego, CA (US); Abhishek Pramod Patil, San Diego, CA (US); Gaurang Naik, San Diego, CA (US); Alfred Asterjadhi, San Diego, CA (US); Sanket Sanjay Kalamkar, San Diego, CA (US); Sai Yiu Duncan Ho, San Diego, CA (US); Giovanni Chisci, San Diego, CA (US); Abhi Shivamurthy, Bangalore (IN); Sanket Gupta, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 18/601,195

(22) Filed: Mar. 11, 2024

(65) Prior Publication Data

US 2025/0287305 A1 Sep. 11, 2025

(51) Int. Cl.
*H04W 52/02* (2009.01)
*H04W 84/12* (2009.01)

(52) U.S. Cl.
CPC ........ *H04W 52/0216* (2013.01); *H04W 84/12* (2013.01)

(58) Field of Classification Search
CPC .. H04W 52/0216; H04W 84/12; H04L 1/1887
See application file for complete search history.

(56) References Cited

U.S. PATENT DOCUMENTS

2015/0139248 A1* 5/2015 Katar .................... H04L 1/1854 370/470
2022/0110053 A1* 4/2022 Chu .................. H04W 52/0216
(Continued)

FOREIGN PATENT DOCUMENTS

WO WO-2021029555 A1 2/2021

OTHER PUBLICATIONS

International Search Report and Written Opinion—PCT/US2025/015262—ISA/EPO—May 22, 2025 (2402484WO).

*Primary Examiner* — Harry H Kim
(74) *Attorney, Agent, or Firm* — Holland & Hart LLP

(57) ABSTRACT

This disclosure provides methods, components, devices and systems for overlapping physical layer protocol data unit (PPDU) end point offset. Some aspects more specifically relate to staggering the end times of overlapping PPDUs transmitted by multiple access points (APs) such that the corresponding block acknowledgments (BAs) are staggered by durations exceeding BA locking periods for the APs. In some examples, a BA may be transmitted by a wireless station (STA) to an AP a short interframe space (SIFS) after the end time of a PPDU transmitted by the AP. When multiple APs transmit concurrent PPDUs, multiple STAs may accordingly transmit corresponding BAs. By implementing techniques to stagger the BAs, an AP that locks onto a BA and determines that the BA is intended for another AP can receive a next staggered BA intended for the AP.

20 Claims, 13 Drawing Sheets

700

(56) References Cited

U.S. PATENT DOCUMENTS

2023/0007609 A1* 1/2023 Li .................... H04W 56/0055
2023/0216633 A1* 7/2023 Cariou .................... H04L 5/005
370/329
2023/0239798 A1* 7/2023 Shafin .................... H04W 4/70
370/338
2024/0187084 A1* 6/2024 Zhang ................ H04W 40/244

* cited by examiner

900

1000

OVERLAPPING PHYSICAL LAYER PROTOCOL DATA UNIT END POINT OFFSET

TECHNICAL FIELD

This disclosure relates generally to wireless communication and, more specifically, to overlapping physical layer protocol data unit (PPDU) end point offset.

DESCRIPTION OF THE RELATED TECHNOLOGY

Wireless communication networks are widely deployed to provide various types of communication content such as voice, video, packet data, messaging, broadcast, and so on. Some wireless communication networks may be capable of supporting communication with multiple users by sharing the available system resources (such as time, frequency, or power). Further, a wireless communication network may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM), among other examples. Wireless communication devices may communicate in accordance with any one or more of such wireless communication technologies, and may include wireless stations (STAs), wireless access points (APs), user equipment (UEs), network entities, or other wireless nodes.

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards may be a Basic Service Set (BSS), which may be managed by an AP. Each BSS is identified by a Basic Service Set Identifier (BSSID) that is advertised by the AP. An AP may periodically broadcast beacon frames to enable any STAs within wireless range of the AP to establish or maintain a communication link with the WLAN. Some wireless local area networks (WLAN) may support spatial reuse between APs. Spatial reuse refers to wireless devices such as APs and client devices in different BSSs communicating in the same service period (SP) or transmission opportunity (TXOP).

Some WLANs may implement target wake time (TWT) in which an AP announces the AP's expected wake time to allow other devices to avoid collisions or monitoring on the AP's announced wake time. Some WLANs may implement restricted TWT (rTWT) which may more efficiently use network resources than TWT. For example, in rTWT, wireless communication devices may reserve resources by announcing rTWT SPs dedicated to an SP owner. For example, rTWT may be used for serving latency sensitive traffic which may have predictable patterns, and therefore rTWT may be used to preschedule SPs dedicated to serving that type of traffic. rTWT may operate on the BSS level and may not be respected across BSSs. Some WLANs may implement coordinated restricted TWT (CrTWT), in which an AP may reserve an SP (such as a set of time resources) which other BSSs respect. For example, in a CrTWT SP for a first AP, APs and STAs in other BSSs may be restricted from transmitting. Multiple APs may transmit physical layer protocol data units (PPDUs) in non-restricted SPs. STAs may transmit block acknowledgments (BAs) to a PPDU.

CrTWT may demand that transmission of PPDUs and BAs be completed prior to a restricted SP (such as an SP reserved according to CrTWT).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications by an apparatus. The method may include obtaining an indication of a common time to end a transmission period associated with communication of physical layer protocol data units (PPDUs), outputting a first PPDU during the transmission period, where the first PPDU at least partially overlaps in time with one or more second PPDUs communicated during the transmission period, where an end time of the first PPDU is different from respective one or more end times of the one or more second PPDUs, and where the end time is based on one or more offsets associated with the one or more second PPDUs and the common time, and obtaining, after the end time and prior to the common time, an acknowledgment (ACK) message responsive to the first PPDU.

Another innovative aspect of the subject matter described in this disclosure can be implemented in a wireless node. The wireless node may include at least one transceiver and a processing system that includes processor circuitry and memory circuitry that stores code. The processing system may be configured to cause the apparatus to receive, via the at least one transceiver, an indication of a common time to end a transmission period associated with communication of PPDUs, transmit, via the at least one transceiver, a first PPDU during the transmission period, where the first PPDU at least partially overlaps in time with one or more second PPDUs communicated during the transmission period, where an end time of the first PPDU is different from respective one or more end times of the one or more second PPDUs, and where the end time is based on one or more offsets associated with the one or more second PPDUs and the common time, and transmit, via the at least one transceiver, after the end time and prior to the common time, an ACK message responsive to the first PPDU.

Another innovative aspect of the subject matter described in this disclosure can be implemented in an apparatus for wireless communications. The apparatus may include means for obtaining an indication of a common time to end a transmission period associated with communication of PPDUs, means for outputting a first PPDU during the transmission period, where the first PPDU at least partially overlaps in time with one or more second PPDUs communicated during the transmission period, where an end time of the first PPDU is different from respective one or more end times of the one or more second PPDUs, and where the end time is based on one or more offsets associated with the one or more second PPDUs and the common time, and means for obtaining, after the end time and prior to the common time, an ACK message responsive to the first PPDU.

Another innovative aspect of the subject matter described in this disclosure can be implemented in a non-transitory computer-readable medium storing code for wireless communications. The code may include instructions executable by one or more processors to obtain an indication of a common time to end a transmission period associated with communication of PPDUs, output a first PPDU during the transmission period, where the first PPDU at least partially overlaps in time with one or more second PPDUs communicated during the transmission period, where an end time of the first PPDU is different from respective one or more end times of the one or more second PPDUs, and where the end time is based on one or more offsets associated with the one or more second PPDUs and the common time, and obtain, after the end time and prior to the common time, an ACK message responsive to the first PPDU.

In some examples of the method, apparatus, wireless node, and non-transitory computer-readable medium described herein, the end time and the respective one or more end times may be based on a first end time, one of the end time and the respective one or more end times may be the first end time, and the first end time may be based on a total quantity of overlapping PPDUs communicated during the transmission period, the total quantity of overlapping PPDUs including the first PPDU and the one or more second PPDUs.

Some examples of the method, apparatus, and non-transitory computer-readable medium described herein may further include operations, features, means, or instructions for calculating the first end time using a short interframe space and one of a maximum ACK message size, an average ACK message size, and a mode ACK message size.

Some examples of the method, apparatus, and non-transitory computer-readable medium described herein may further include operations, features, means, or instructions for obtaining respective identifiers associated with respective devices that communicate the one or more second PPDUs and selecting the end time from a candidate set of end times that includes the first end time and one or more end times, said selection being based on an order of the respective identifiers.

Some examples of the method, apparatus, and non-transitory computer-readable medium described herein may further include operations, features, means, or instructions for selecting the end time randomly from a candidate set of end times including the first end time and one or more end times.

Some examples of the method, apparatus, and non-transitory computer-readable medium described herein may further include operations, features, means, or instructions for outputting a first beacon scheduling the first PPDU, obtaining one or more respective second beacons scheduling the one or more second PPDUs, and selecting the end time from a candidate set of end times including the first end time and one or more end times, said selection being based on a temporal order of transmission of the first beacon and the one or more respective second beacons.

Some examples of the method, apparatus, and non-transitory computer-readable medium described herein may further include operations, features, means, or instructions for outputting or obtaining, prior to outputting the first PPDU, a control message that indicates that the transmission period may be designated for spatial reuse, where the one or more second PPDUs may be communicated during the transmission period based on the control message.

In some examples of the method, apparatus, and non-transitory computer-readable medium described herein, the control message includes an indication of the end time and the respective one or more end times.

In some examples of the method, apparatus, and non-transitory computer-readable medium described herein, the control message includes an indication of a first end time and an indication of an ordering of the end time and the respective one or more end times, the first end time may be one of the end time and the respective one or more end times, and the one or more offsets may be based on the first end time.

Some examples of the method, apparatus, and non-transitory computer-readable medium described herein may further include operations, features, means, or instructions for obtaining buffer status reports associated with one or more wireless nodes that communicate the one or more second PPDUs, where the end time and the respective one or more end times may be based on the buffer status reports.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
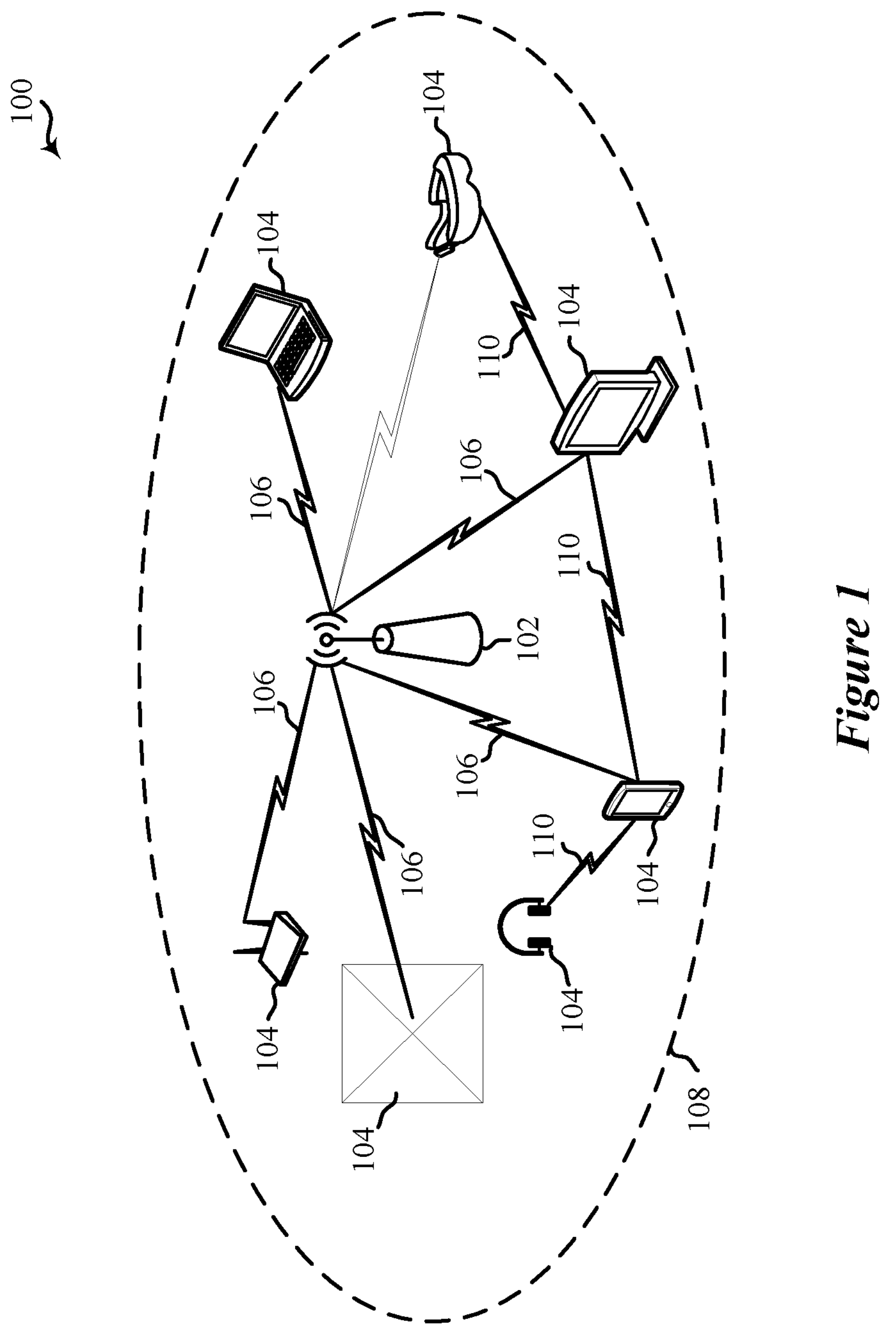
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IOT) network.

Various aspects relate generally to staggering the end times of overlapping physical (PHY) layer protocol data units (PPDUs) transmitted by multiple access points (APs) such that the corresponding block acknowledgments (BAs) are staggered by durations exceeding BA locking periods for the APs. For example, a BA may be transmitted by a wireless station (STA) to an AP a short interframe space (SIFS) after the end time of a PPDU transmitted by the AP. Some aspects more specifically relate to ordering of end times for the overlapping PPDUs. In some examples, the APs may determine respective end points for the PPDUs based on determining a universal PPDU end point and applying ordered staggering periods to the universal end point. In some examples, an AP may coordinate the sharing of a service period (SP) (for example, may be a sharing AP) among a set of other APs (shared APs), and the sharing AP may coordinate or indicate the order of the end time staggering for the multiple APs.

Particular aspects of the subject matter described in this disclosure can be implemented to realize one or more of the following potential advantages. In some examples, by staggering PPDU end times, the described techniques can be used to ensure that BAs transmitted in response to overlapping PPDUs transmitted by multiple APs are staggered by durations exceeding BA locking periods for the APs. For example, when multiple APs transmit concurrent or overlapping PPDUs, multiple STAs may accordingly transmit corresponding BAs. Each AP may lock reception circuitry onto the first BA that arrives. Each AP may have a locking period that corresponds to the time for the AP to decode a field in the BA that indicates the intended recipient of the BA. By implementing techniques to stagger the BAs by a duration greater than the locking period, an AP that locks onto a BA and determines that the BA is intended for another AP can receive a next staggered BA intended for the AP. In some examples, by implementing techniques for each AP to determine a universal end time and a staggering order, the staggering techniques may be implemented without additional control signaling overhead. In some examples, a sharing AP may control the staggering order to ensure that the highest priority data is transmitted first.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PPDUs.

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHZ, 5 GHz, 6 GHZ, 45 GHZ, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHZ-7.125 GHZ), FR2 (24.25 GHZ-52.6 GHZ), FR3 (7.125 GHZ-24.25 GHZ), FR4a or FR4-1 (52.6 GHZ-71 GHZ), FR4 (52.6 GHz-114.25 GHZ), and FR5 (114.25 GHZ-300 GHZ).

Each of the frequency bands may include multiple sub-bands and frequency channels (also referred to as subchannels). The terms “channel” and “subchannel” may be used interchangeably herein, as each may refer to a portion of frequency spectrum within a frequency band (for example, a 20 MHz, 40 MHZ, 80 MHz, or 160 MHZ portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHZ, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHZ, 160 MHZ, 240 MHZ, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (for example, for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHZ channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (for example, UHR- or IEEE 802.11bn-compatible) devices for opportunistic access to spectrum that may be otherwise under-utilized.

Figure 2:
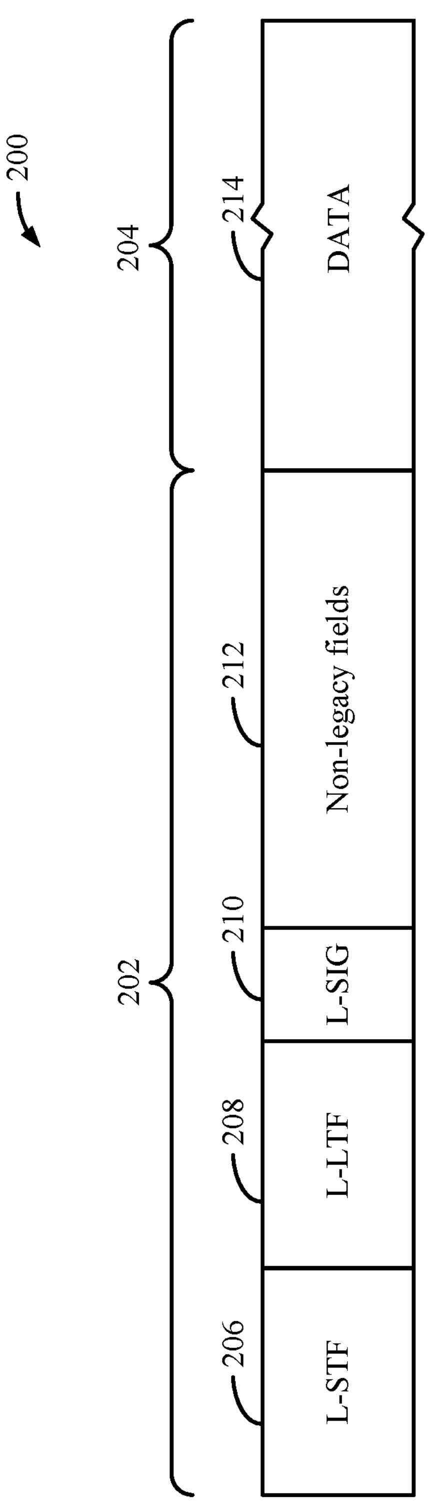
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
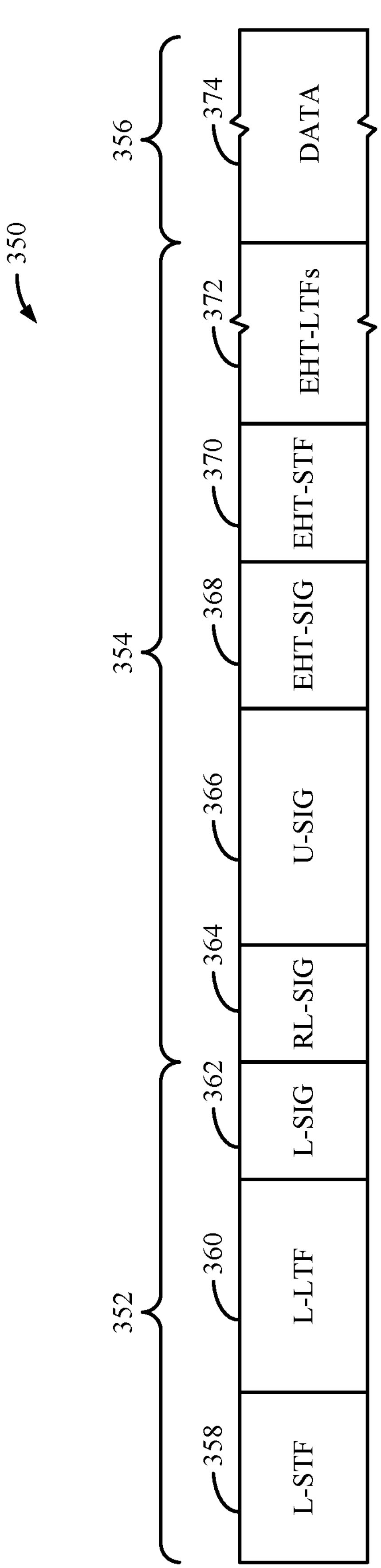
FIG. 3 shows an example physical layer (PHY) protocol data unit (PPDU) usable for communications between a wireless AP and one or more wireless STAs.

FIG. 3 shows an example PPDU 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as “U-SIG 366”) and an EHT signal field 368 (referred to herein as “EHT-SIG 368”). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as an AP 102 or a STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
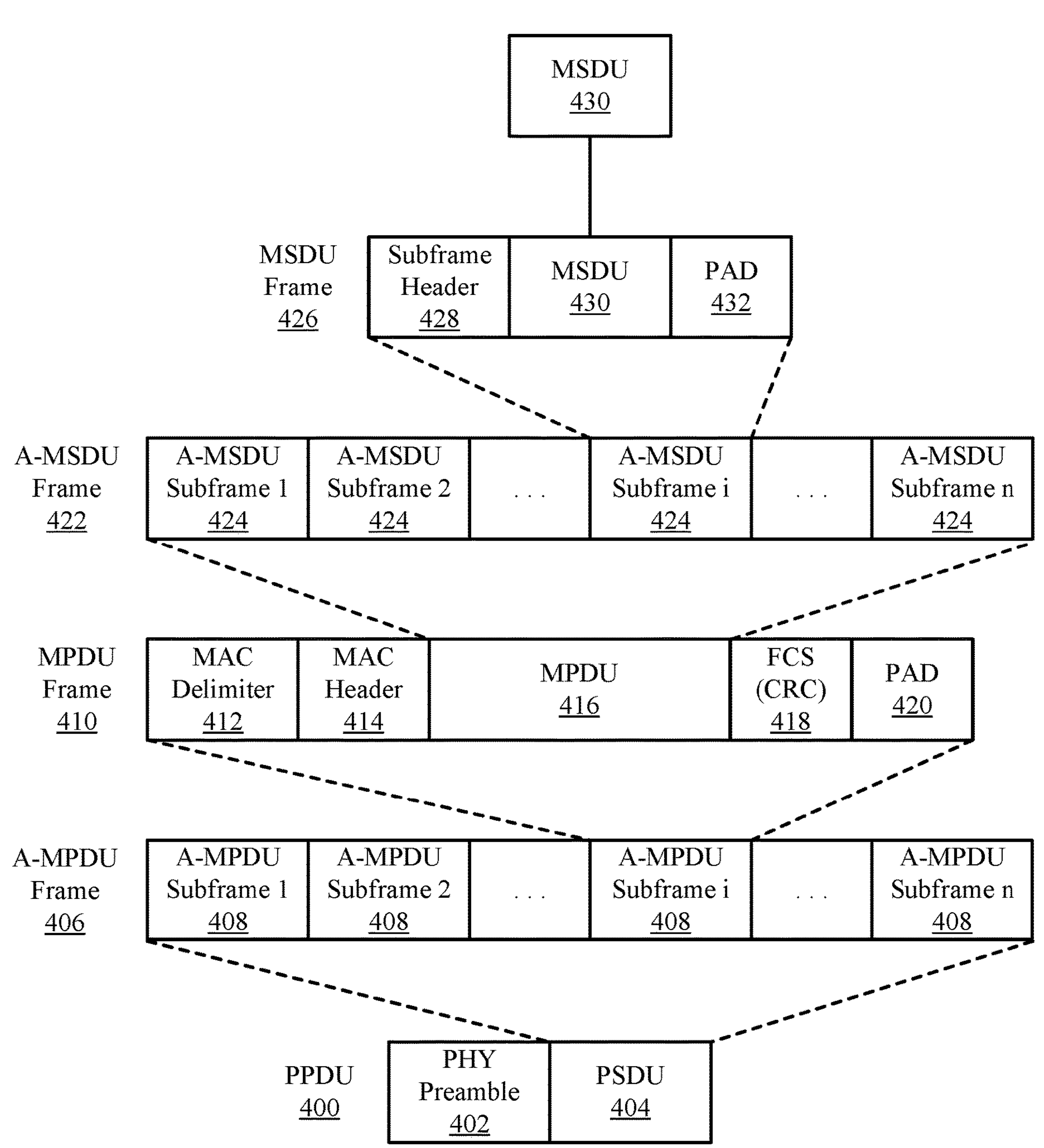
FIG. 4 shows a hierarchical format of an example PPDU usable for communications between a wireless AP and one or more wireless STAs.

FIG. 4 shows a hierarchical format of an example PPDU usable for communications between a wireless AP and one or more wireless STAs. For example, the AP and STAs may be examples of the AP 102 and the STAs 104 described with reference to FIG. 1. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 408 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field 418 may include a cyclic redundancy check (CRC)) and padding bits 420. The MPDU 416 may carry one or more MAC service data units (MSDUs) 430. For example, the MPDU 416 may carry an aggregated MSDU (A-MSDU) 422 including multiple A-MSDU subframes 424. Each A-MSDU subframe 424 may be associated with an MSDU frame 426 and may contain a corresponding MSDU 430 preceded by a subframe header 428 and, in some examples, followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body. The MAC header 414 includes a duration field indicating a duration extending from the end of the PPDU until at least the end of an acknowledgement (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 414 also includes one or more fields indicating addresses for the data encapsulated within the frame body. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (for example, by generating a message integrity check (MIC) for one or more relevant fields.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device (such as the AP 102 or the STA 104) may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is compared to a threshold to determine (for example, identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

In some other examples, the wireless communication device (for example, the AP 102 or the STA 104) may contend for access to the wireless medium of a WLAN in accordance with an enhanced distributed channel access (EDCA) procedure. A random channel access mechanism such as EDCA may afford high-priority traffic a greater likelihood of gaining medium access than low-priority traffic. The wireless communication device using EDCA may classify data into different access categories. Each AC may be associated with a different priority level and may be assigned a different range of random backoffs (RBOs) so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

Some APs and STAs (for example, the AP 102 and the STAs 104 described with reference to FIG. 1) may implement spatial reuse techniques. For example, APs 102 and STAs 104 configured for communications using the protocols defined in the IEEE 802.11ax or 802.11be standard amendments may be configured with a BSS color. APs 102 associated with different BSSs may be associated with different BSS colors. A BSS color is a numerical identifier of an AP 102's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or the STA 104 may apply different contention parameters in accordance with whether the wireless packet is transmitted by, or transmitted to, another wireless communication device (such another AP 102 or STA 104) within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first RSSI detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

Some APs and STAs (for example, the AP 102 and the STAs 104 described with reference to FIG. 1) may implement techniques for spatial reuse that involve participation in a coordinated communication scheme. According to such techniques, an AP 102 may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP. The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions of the TXOP. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some examples of OFDMA techniques, each portion of the plurality of portions of the TXOP includes a set of frequency resources that do not overlap with any frequency resources of any other portion of the plurality of portions. In such examples, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units associated with each portion of the TXOP such as for multi-user OFDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or enhanced distributed channel access (EDCA) techniques. Additionally, by enabling a group of APs 102 associated with different BSSs to participate in a coordinated AP transmission session, during which the group of APs may share at least a portion of a single TXOP obtained by any one of the participating APs, such techniques may increase throughput across the BSSs associated with the participating APs and also may achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs 104 associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, a receive (RX) power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may be allocated resources during the TXOP as described above.

Retransmission protocols, such as hybrid automatic repeat request (HARQ), also may offer performance gains. A HARQ protocol may support various HARQ signaling between transmitting and receiving wireless communication devices (for example, the AP 102 and the STAs 104 described with reference to FIG. 1) as well as signaling between the PHY and MAC layers to improve the retransmission operations in a wireless communication network. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a wireless communication network may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (for example, a negative acknowledgment (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an automatic repeat request (ARQ) protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Some APs and STAs, such as, for example, the AP 102 and STAs 104 described with reference to FIG. 1, are capable of multi-link operation (MLO). For example, the AP 102 and STAs 104 may support MLO as defined in one or both of the IEEE 802.11be and 802.11bn standard amendments. An MLO-capable device may be referred to as a multi-link device (MLD). In some examples, MLO supports establishing multiple different communication links (such as a first link on the 2.4 GHz band, a second link on the 5 GHz band, and the third link on the 6 GHz band) between MLDs. Each communication link may support one or more sets of channels or logical entities. For example, an AP MLD may set, for each of the communication links, a respective operating bandwidth, one or more respective primary channels, and various BSS configuration parameters. An MLD may include a single upper MAC entity, and can include, for example, three independent lower MAC entities and three associated independent PHY entities for respective links in the 2.4 GHz, 5 GHZ, and 6 GHz bands. This architecture may enable a single association process and security context. An AP MLD may include multiple APs 102 each configured to communicate on a respective communication link with a respective one of multiple STAs 104 of a non-AP MLD (also referred to as a "STA MLD").

To support MLO techniques, an AP MLD and a STA MLD may exchange MLO capability information (such as supported aggregation types or supported frequency bands, among other information). In some examples, the exchange of information may occur via a beacon frame, a probe request frame, a probe response frame, an association request frame, an association response frame, another management frame, a dedicated action frame, or an operating mode indicator (OMI), among other examples. In some examples, an AP MLD may designate a specific channel of one link in one of the bands as an anchor channel on which it transmits beacons and other control or management frames periodically. In such examples, the AP MLD also may transmit shorter beacons (such as ones which may contain less information) on other links for discovery or other purposes.

MLDs may exchange packets on one or more of the communications links dynamically and, in some instances, concurrently. MLDs also may independently contend for access on each of the communication links, which achieves latency reduction by enabling the MLD to transmit its packets on the first communication link that becomes available. For example, "alternating multi-link" may refer to an MLO mode in which an MLD may listen on two or more different high-performance links and associated channels concurrently. In an alternating multi-link mode of operation, an MLD may alternate between use of two links to transmit portions of its traffic. Specifically, an MLD with buffered traffic may use the first link on which it wins contention and obtains a TXOP to transmit the traffic. While such an MLD may in some examples be capable of transmitting or receiving on only one communication link at any given time, having access opportunities via two different links enables the MLD to avoid congestion, reduce latency, and maintain throughput.

Multi-link aggregation (MLA) (which also may be referred to as carrier aggregation (CA)) is another MLO mode in which an MLD may simultaneously transmit or receive traffic to or from another MLD via multiple communication links in parallel such that utilization of available resources may be increased to achieve higher throughput. That is, during at least some duration of time, transmissions or portions of transmissions may occur over two or more communication links in parallel at the same time. In some examples, the parallel communication links may support synchronized transmissions. In some other examples, or during some other durations of time, transmissions over the communication links may be parallel, but not be synchronized or concurrent. Additionally, in some examples or durations of time, two or more of the communication links may be used for communications between MLDs in the same direction (such as all uplink or all downlink), while in some other examples or durations of time, two or more of the communication links may be used for communications in different directions (for example, one or more communication links may support uplink communications and one or more communication links may support downlink communications). In such examples, at least one of the MLDs may operate in a full duplex mode.

MLA may be packet-based or flow-based. For packet-based aggregation, frames of a single traffic flow (such as all traffic associated with a given traffic identifier (TID)) may be transmitted concurrently across multiple communication links. For flow-based aggregation, each traffic flow (such as all traffic associated with a given TID) may be transmitted using a single respective one of multiple communication links. As an example, a single STA MLD may access a web browser while streaming a video in parallel. Per the above example, the traffic associated with the web browser access may be communicated over a first communication link while the traffic associated with the video stream may be communicated over a second communication link in parallel (such that at least some of the data may be transmitted on the first channel concurrently with data transmitted on the second channel). In some other examples, MLA may be implemented with a hybrid of flow-based and packet-based aggregation. For example, an MLD may employ flow-based aggregation in situations in which multiple traffic flows are created and may employ packet-based aggregation in other situations. Switching among the MLA techniques or modes may additionally, or alternatively, be associated with other metrics (such as a time of day, traffic load within the network, or battery power for a wireless communication device, among other factors or considerations).

Other MLO techniques may be associated with traffic steering and QoS characterization, which may achieve latency reduction and other QoS enhancements by mapping traffic flows having different latency or other requirements to different links. For example, traffic with low latency requirements may be mapped to communication links operating in the 6 GHz band and more latency-tolerant flows may be mapped to communication links operating in the 2.4 GHz or 5 GHz bands. Such an operation, referred to as TID-to-Link mapping (TTLM), may enable two MLDs to negotiate mapping of certain traffic flows in the DL direction or the UL direction or both directions to one or more set of communication links set up between them. In some examples, an AP MLD may advertise a global TTLM that applies to all associated non-AP MLDs. A communication link that has no TIDs mapped to it in either direction is referred to as a disabled link. An enabled link has at least one TID mapped to it in at least one direction.

In some examples, an MLD may include multiple radios and each communication link associated with the MLD may be associated with a respective radio of the MLD. Each radio may include one or more of its own transmit/receive (Tx/Rx) chains, include or be coupled with one or more of its own physical antennas or shared antennas, and include signal processing components, among other components. An MLD with multiple radios that may be used concurrently for MLO may be referred to as a multi-link multi-radio (MLMR) MLD. Some MLMR MLDs may further be capable of an enhanced MLMR (eMLMR) mode of operation, in which the MLD may be capable of dynamically switching radio resources (such as antennas or RF frontends) between multiple communication links (for example, switching from using radio resources for one communication link to using the radio resources for another communication link) to enable higher transmission and reception using higher capacity on a given communication link. In this eMLMR mode of operation, MLDs may be able to move Tx/Rx radio resources from one communication link to another link, thereby increasing the spatial stream capability of the other communication link. For example, if a non-AP MLD includes four or more STAs, the STAs associated with the eMLMR links may “pool” their antennas so that each of the STAs can utilize the antennas of other STAs when transmitting or receiving on one of the eMLMR links.

Other MLDs may have more limited capabilities and not include multiple radios. An MLD with only a single radio that is shared for multiple communication links may be referred to as a multi-link single radio (MLSR) MLD. Control frames may be exchanged between MLDs before initiating data or management frame exchanges between the MLDs in cases in which at least one of the MLDs is operating as an MLSR MLD. Because an MLD operating in the MLSR mode is limited to a single radio, it cannot use multiple communication links simultaneously and may instead listen to (for example, monitor), transmit or receive on only a single communication link at any given time. An MLSR MLD may instead switch between different bands in a TDM manner. In contrast, some MLSR MLDs may further be capable of an enhanced MLSR (eMLSR) mode of operation, in which the MLD can concurrently listen on multiple links for specific types of packets, such as buffer status report poll (BSRP) frames or multi-user (MU) request-to-send (RTS) (MU-RTS) frames. Although an MLD operating in the eMLSR mode can still transmit or receive on only one of the links at any given time, it may be able to dynamically switch between bands, resulting in improvements in both latency and throughput. For example, when the STAs of a non-AP MLD may detect a BSRP frame on their respective communication links, the non-AP MLD may tune all of its antennas to the communication link on which the BSRP frame is detected. By contrast, a non-AP MLD operating in the MLSR mode can only listen to, and transmit or receive on, one communication link at any given time.

An MLD that is capable of simultaneous transmission and reception on multiple communication links may be referred to as a simultaneous transmission and reception (STR) device. In a STR-capable MLD, a radio associated with a communication link can independently transmit or receive frames on that communication link without interfering with, or without being interfered with by, the operation of another radio associated with another communication link of the MLD. For example, an MLD with a suitable filter may simultaneously transmit on a 2.4 GHZ band and receive on a 5 GHz band, or vice versa, or simultaneously transmit on the 5 GHz band and receive on the 6 GHz band, or vice versa, and as such, be considered a STR device for the respective paired communication links. Such an STR-capable MLD may generally be an AP MLD or a higher-end STA MLD having a higher performance filter. An MLD that is not capable of simultaneous transmission and reception on multiple communication links may be referred to as a non-STR (NSTR) device. A radio associated with a given communication link in an NSTR device may experience interference when there is a transmission on another communication link of the NSTR device. For example, an MLD with a standard filter may not be able to simultaneously transmit on a 5 GHz band and receive on a 6 GHz band, or vice versa, and as such, may be considered a NSTR device for those two communication links.

In some wireless communication systems, an MLD may include multiple non-collocated entities. For example, an AP MLD may include non-collocated AP devices and a STA MLD may include non-collocated STA devices. In examples in which an AP MLD includes multiple non-collocated AP devices, a single mobility domain (SMD) entity may refer to a logical entity that controls the associated non-collocated APs. A non-AP STA (such as a non-MLD non-AP STA or a non-AP MLD that includes one or more associated non-AP STAs) may associate with the SMD entity via one of its constituent APs and may seamlessly roam (such as without requiring reassociation) between the APs associated with the SMD entity. The SMD entity also may maintain other context (such as security and Block ACK) for non-AP STAs associated with it.

The afore-mentioned and related MLO techniques may provide multiple benefits to a wireless communication network 100. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the “on” time of a modem, which may benefit a wireless communication device in terms of power consumption. Another benefit of MLO is the increased multiplexing opportunities in the case of a single BSS. For example, MLA may increase the number of users per multiplexed transmission served by the multi-link AP MLD.

In some environments, locations, or conditions, a regulatory body may impose a power spectral density (PSD) limit for one or more communication channels or for an entire band (for example, the 6 GHz band). A PSD is a measure of transmit power as a function of a unit bandwidth (such as per 1 MHz). The total transmit power of a transmission is consequently the product of the PSD and the total bandwidth by which the transmission is sent. Unlike the 2.4 GHz and 5 GHz bands, the United States Federal Communications Commission (FCC) has established PSD limits for low power devices when operating in the 6 GHz band. The FCC has defined three power classes for operation in the 6 GHz band: standard power, low power indoor, and very low power. Some APs 102 and STAs 104 that operate in the 6 GHz band may conform to the low power indoor (LPI) power class, which limits the transmit power of APs 102 and STAs 104 to 5 decibel-milliwatts per megahertz (dBm/MHz) and −1 dBm/MHz, respectively. In other words, transmit power in the 6 GHz band is PSD-limited on a per-MHz basis.

Such PSD limits can undesirably reduce transmission ranges, reduce packet detection capabilities, and reduce channel estimation capabilities of APs 102 and STAs 104. In some examples in which transmissions are subject to a PSD limit, the AP 102 or the STAs 104 of a wireless communication network 100 may transmit over a greater transmission bandwidth to allow for an increase in the total transmit power, which may increase an SNR and extend coverage of the wireless communication devices. For example, to overcome or extend the PSD limit and improve SNR for low power devices operating in PSD-limited bands, 802.11be introduced a duplicate (DUP) mode for a transmission, by which data in a payload portion of a PPDU is modulated for transmission over a "base" frequency sub-band, such as a first RU of an OFDMA transmission, and copied over (for example, duplicated) to another frequency sub-band, such as a second RU of the OFDMA transmission. In DUP mode, two copies of the data are to be transmitted, and, for each of the duplicate RUs, using dual carrier modulation (DCM), which also has the effect of copying the data such that two copies of the data are carried by each of the duplicate RUs, so that, for example, four copies of the data are transmitted. While the data rate for transmission of each copy of the user data using the DUP mode may be the same as a data rate for a transmission using a "normal" mode, the transmit power for the transmission using the DUP mode may be essentially multiplied by the number of copies of the data being transmitted, at the expense of requiring an increased bandwidth. As such, using the DUP mode may extend range but reduce spectrum efficiency.

In some other examples in which transmissions are subject to a PSD limit, a distributed tone mapping operation may be used to increase the bandwidth via which a STA 104 transmits an uplink communication to the AP 102. As used herein, the term "distributed transmission" refers to a PPDU transmission on noncontiguous tones (or subcarriers) of a wireless channel. In contrast, the term "contiguous transmission" refers to a PPDU transmission on contiguous tones. As used herein, a logical RU represents a number of tones or subcarriers that are allocated to a given STA 104 for transmission of a PPDU. As used herein, the term "regular RU" (or rRU) refers to any RU or MRU tone plan that is not distributed, such as a configuration supported by 802.11be or earlier versions of the IEEE 802.11 family of wireless communication protocol standards. As used herein, the term "distributed RU" (or dRU) refers to the tones distributed across a set of noncontiguous subcarrier indices to which a logical RU is mapped. The term "distributed tone plan" refers to the set of noncontiguous subcarrier indices associated with a dRU. The channel or portion of a channel within which the distributed tones are interspersed is referred to as a spreading bandwidth, which may be, for example, 40 MHz, 80 MHz or more. The use of dRUs may be limited to uplink communications because benefits to addressing PSD limits may only be present for uplink communications.

Figure 5:
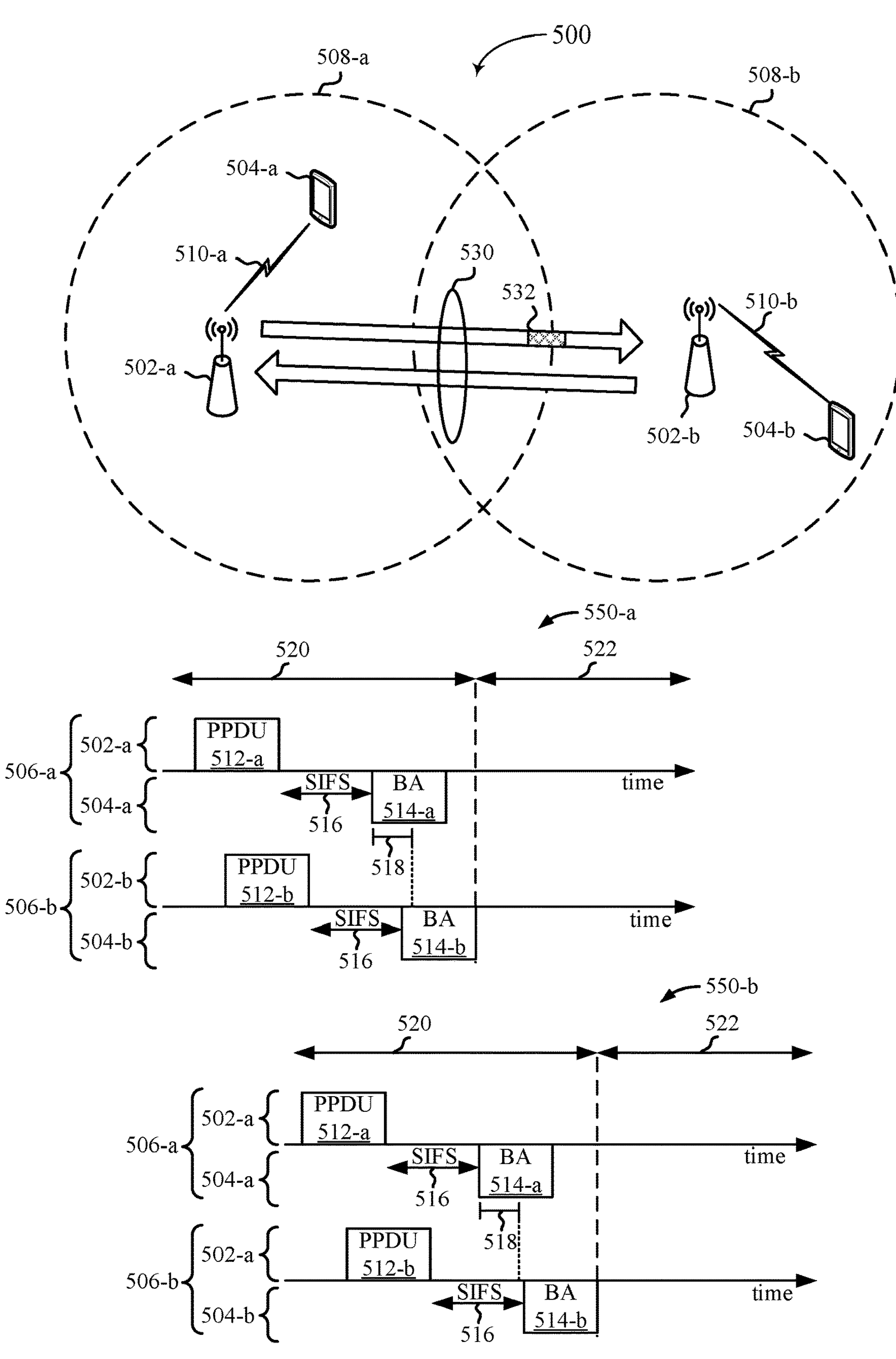
FIG. 5 shows an example of a signaling diagram that supports overlapping PPDU end point offset.

FIG. 5 shows an example of a signaling diagram 500 that supports overlapping PPDU end point offset. The signaling diagram 500 may implement or may be implemented by aspects of the wireless communication network 100. For example, the signaling diagram 500 may include an AP 502-*a* and an AP 502-*b*, which may be examples of APs 102 as described with reference to FIG. 1. The signaling diagram 500 may include a STA 504-*a* and a STA 504-*b*, which may be examples of STAs 104 as described with reference to FIG. 1. For example, the STA 504-*a* may be within a coverage area 508-*a* of the AP 502-*a* and the STA 504-*b* may be within a coverage area 508-*b* of the AP 502-*b*. The AP 502-*a* and the STA 504-*a* may communicate via a wireless communication link 510-*a* and may be associated with a BSS 506-*a*, and the AP 502-*b* and the STA 504-*b* may communicate via a wireless communication link 510-*b* and may be associated with a BSS 506-*b*. In some examples, the AP 502-*a* may communicate with the AP 502-*b* via a communication link 530. A wireless node may refer to a wireless communication device, such as an AP (e.g., AP 502-*a*) or a STA (e.g., STA 504-*a*) that communicates via the wireless communication network 100.

Some WLANs, such as the WLANs shown in FIG. 5 may implement coordinated restricted TWT (CrTWT), in which an AP 502 may reserve an SP (for example, a set of time resources) which other BSSs 506 respect. For example, the AP 502-*a* may announce (for example, may transmit a control message 532 that indicates) an SP 522 which the BSS 506-*b* must respect. CrTWT may ensure exclusive medium access for one BSS 506 (such as the BSS 506-*a*) without interference from overlapping BSSs (OBSSs). CrTWT may be used with other AP-level coordination schemes such as coordinated TDMA (cTDMA). CrTWT may dictate that announced SPs (such as the SP 522) must be respected across OBSSs, and thus each of the OBSSs may truncate the corresponding TXOP before the announced SP (such as the SP 522). For example, the wireless communication devices in the BSS 506-*b* (such as the AP 502-*b* and the STA 504-*b*) may not transmit during the SP 522 and must truncate transmissions during the SP 520 before the start of the SP 522.

TXOP truncation may account for the SIFS duration and the BA duration such that the BAs are fully transmitted and received within the SP 520. For example, the AP 502-*a* may transmit a PPDU 512-*a* during the SP 520 to the STA 504-*a* and the STA 504-*a* may transmit a BA 514-*a* in response to the PPDU 512-*a* a SIFS duration 516 after the end of the transmission of the PPDU 512-*a*. Similarly, the AP 502-*b* may transmit a PPDU 512-*b* during the SP 520 to the STA 504-*b* and the STA 504-*b* may transmit a BA 514-*b* in response to the PPDU 512-*b* a SIFS duration 516 after the end of the transmission of the PPDU 512-*b*. Practically, a BA 514 in one BSS 506 may be slightly shifted with respect to the BA in other BSSs 506, for example, due to slightly different PPDU start times and different PPDU durations. Consequently, each AP 502 may lock reception circuitry onto the first BA 514 (such as the BA 514-*a* as shown in FIG. 5) received on the medium. If the duration between the BA 514-*a* and the BA 514-*b* is shorter than the time for the AP 502-*b* to decode the field in the BA 514-*a* that indicates that BA 514-*a* is intended for the AP 502-*a*, then the AP 502-*b* may not be able to unlock from the BA 514-*a* to receive and decode the BA 514-*b*. The time for an AP 502-*b* to decode the field in the BA 514 that indicates which AP 502 is the intended recipient and unlock the receiver circuitry from that BA 514 to receive another BA 514 may be referred to as a false locking period 518.

The conditions to miss a BA 514 due to false locking may be: 1) the intended recipient AP 502 of the BA 514 is locked onto another BA; and 2) the time elapsed since the intended recipient device has locked onto the wrong BA does not exceed the false locking period when the second BA arrives. For example, as shown in the timing diagram 550-*a*, the duration between the start of the BA 514-*a* and the start of the BA 514-*b* is less than the false locking period 518, and thus the AP 502-*b* may miss the BA 514-*b*. As shown in the timing diagram 550-*b*, the duration between the start of the BA 514-*a* and the start of the BA 514-*b* is greater than the false locking period 518, and thus the AP 502-*b* may recover from false locking and may receive the BA 514-*b*. Accordingly, to avoid missing BAs 514 due to false locking, the BAs 514 exchanged in BSSs 506 that overlap (for example, BSSs 506 with overlapping coverage areas 508) may be staggered by a duration that is greater than the false locking period 518, for example, as shown in the timing diagram 550-*b*.

Figure 6:
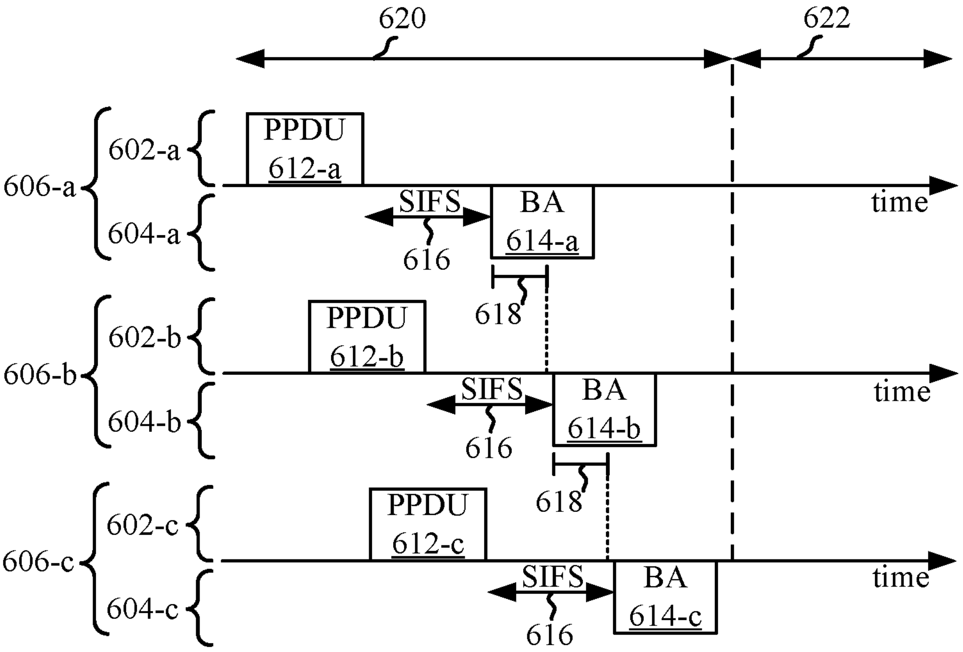
FIG. 6 shows an example of a timing diagram that supports overlapping PPDU end point offset.

FIG. 6 shows an example of a timing diagram 600 that supports overlapping PPDU end point offset. The timing diagram 600 may implement or may be implemented by aspects of the wireless communication network 100 or the signaling diagram 500. For example, the timing diagram 600 may include an AP 602-*a*, an AP 602-*b*, and an AP 602-*c*, which may be examples of APs 102 as described with reference to FIG. 1 or APs 502 as described with reference to FIG. 5. The timing diagram 600 may include a STA 604-*a*, a STA 604-*b*, and a STA 604-*c*, which may be examples of STAs 104 as described with reference to FIG. 1 or STAs 504 as described with reference to FIG. 5. The AP 602-*a* and the STA 604-*a* may be associated with a BSS 606-*a*, the AP 602-*b* and the STA 604-*b* may be associated with a BSS 606-*b*, and the AP 602-*c* and the STA 604-*c* may be associated with a BSS 606-*c*.

In a first transmission period 620 (for example, an SP such as a spatial reuse SP), the APs 602 may transmit overlapping PPDUs 612. For example, the AP 602-*a* may transmit a PPDU 612-*a*, and in response the STA 604-*a* may transmit a BA 614-*a* a SIFS duration 616 after the end of the PPDU 612-*a*. The AP 602-*b* may transmit a PPDU 612-*b*, and in response the STA 604-*b* may transmit a BA 614-*b* a SIFS duration 616 after the end of the PPDU 612-*b*. The AP 602-*c* may transmit a PPDU 612-*c*, and in response the STA 604-*c* may transmit a BA 614-*c* a SIFS duration 616 after the end of the PPDU 612-*c*. The second transmission period 622 (such as a service period) may be restricted. For example, one of the APs 602 may announce a reservation of the second transmission period 622 (for example, a CrTWT SP). Thus, transmission of the BAs 614 may each be completed prior to the start of the second transmission period 622. For example, the start of the second transmission period 622 may be a common time to end the first transmission period 620 for the BSS 606-*a*, the BSS 606-*b*, and the BSS 606-*c*.

As shown in the timing diagram 600, the duration between the start of the BA 614-*a* and the start of the BA 614-*b* is greater than the false locking period 618, and thus the AP 602-*b* may recover from false locking and may receive the BA 614-*b*. Similarly, the duration between the start of the BA 614-*b* and the start of the BA 614-*c* is greater than the false locking period 618, and thus the AP 602-*c* may recover from false locking and may receive the BA 614-*c*.

Figure 7:
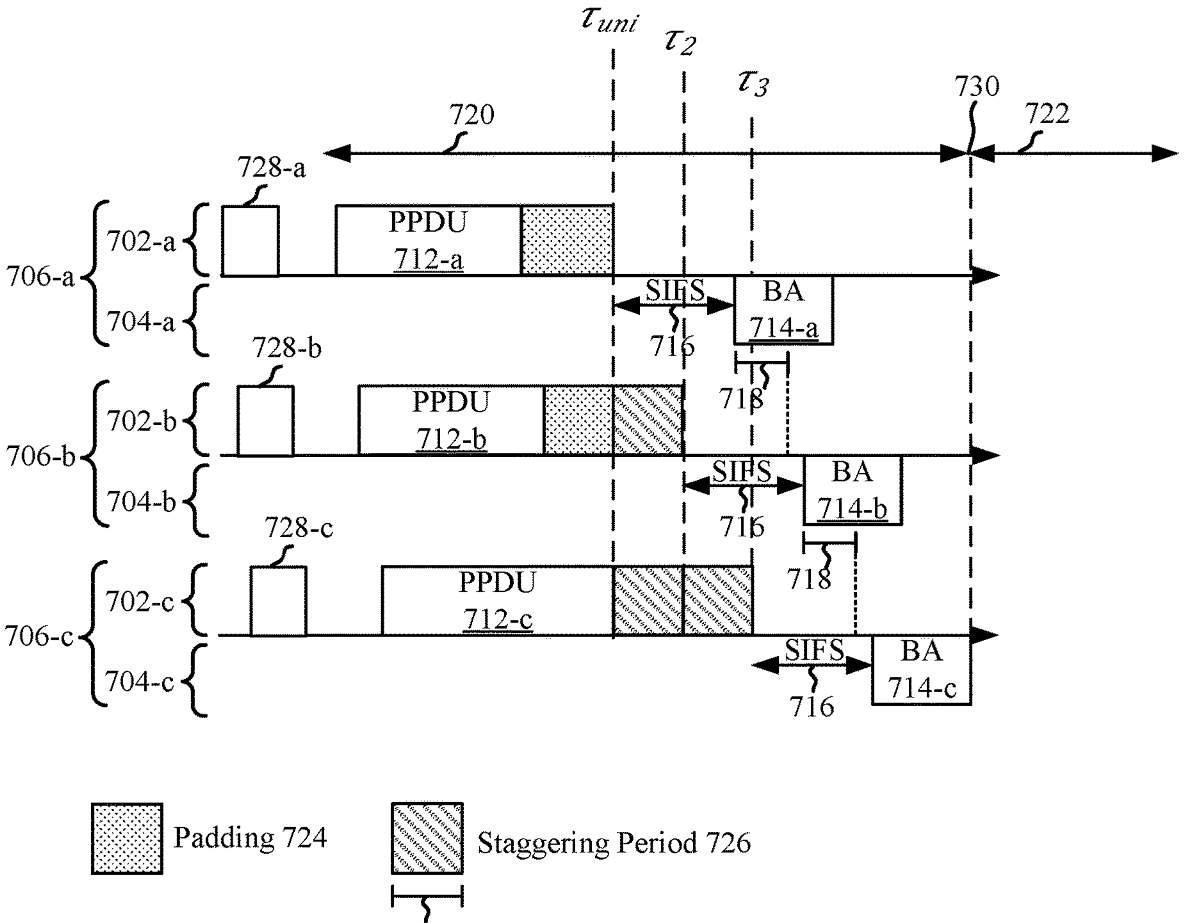
FIG. 7 shows an example of a timing diagram that supports overlapping PPDU end point offset.
Figure 7:
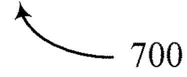

FIG. 7 shows an example of a timing diagram 700 that supports overlapping PPDU end point offset. The timing diagram 700 may implement or may be implemented by aspects of the wireless communication network 100, the signaling diagram 500, or the timing diagram 600. For example, the timing diagram 700 may include an AP 702-*a*, an AP 702-*b*, and an AP 702-*c*, which may be examples of APs 102 as described with reference to FIG. 1, APs 502 as described with reference to FIG. 5, or APs 602 as described with reference to FIG. 6. The timing diagram 700 may include a STA 704-*a*, a STA 704-*b*, and a STA 704-*c*, which may be examples of STAs 104 as described with reference to FIG. 1, STAs 504 as described with reference to FIG. 5, or STAs 604 as described with reference to FIG. 6. The AP 702-*a* and the STA 704-*a* may be associated with a BSS 706-*a*, the AP 702-*b* and the STA 704-*b* may be associated with a BSS 706-*b*, and the AP 702-*c* and the STA 704-*c* may be associated with a BSS 706-*c*.

In a first transmission period 720 (for example, a spatial reuse SP), the APs 702 may transmit overlapping PPDUs 712. For example, the AP 702-*a* may transmit a PPDU 712-*a*, and in response the STA 704-*a* may transmit a BA 714-*a* a SIFS duration 716 after the end of the PPDU 712-*a*. The AP 702-*b* may transmit a PPDU 712-*b*, and in response the STA 704-*b* may transmit a BA 714-*b* a SIFS duration 716 after the end of the PPDU 712-*b*. The AP 702-*c* may transmit a PPDU 712-*c*, and in response the STA 704-*c* may transmit a BA 714-*c* a SIFS duration 716 after the end of the PPDU 712-*c*. There may be a common end time 730 for the first transmission period 720 for the BSS 706-*a*, the BSS 706-*b*, and the BSS 706-*c*. For example, the first transmission period 720 may be followed by a second transmission period 722 that may be restricted. For example, one of the APs 702 may announce a reservation of the second transmission period 722 (for example, a CrTWT SP). Thus, transmission of the BAs 714 may each be completed prior to the start of the second transmission period 722.

As shown in the timing diagram 700, the APs 702 may implement PPDU end time staggering to avoid missing BAs 714 due to false locking. For example, the duration between the start of the BA 714-*a* and the start of the BA 714-*b* is greater than the false locking period 718, and thus the AP 702-*b* may recover from false locking and may receive the BA 714-*b*. Similarly, the duration between the start of the BA 614-*b* and the start of the BA 714-*c* is greater than the false locking period 718, and thus the AP 702-*c* may recover from false locking and may receive the BA 714-*c*.

To achieve PPDU synchronization which precedes PPDU end time staggering, the APs 702 may overcome multiple sources of random timing variations. For example, to overcome variable PPDU sizes across the BSSs 706 that are overlapping (for example, the BSSs 706 may have overlapping coverage areas), the PPDU end time across the BSSs 706 that are overlapping may be unified. For example, short PPDUs can include padding 724 (for example, padding bits) to match longer PPDUs. To overcome variable BA 714 size, which may demand an AP 702 to truncate a PPDU 712 so that the duration of the PPDU 712+SIFS duration 716+the duration of the BA 714 terminates before the second transmission period 722, the unified PPDU end time may be early enough so that the first transmission period 720 may fit the PPDUs 712+(N−1) staggering periods+SIFs durations+the largest BA 714 across all of the BSSs 706 that overlap, where N may refer to the quantity of PPDUs 712 (for example, the quantity of overlapping BSSs 706 in which an AP 702 transmits a PPDU 712 during the first transmission period 720). The universal or unified PPDU end time, $\tau_{uni}$, may be calculated as $\tau_{uni}=\text{NextSP}_{start}-(N-1)\tau_{stagger}-\text{SIFS}-\max(\text{BA}_{size})$, where $\text{NextSP}_{start}$ is the time of the start of the second transmission period 722 (or the common time in which each BSS must end transmission during the first transmission period 720), $\tau_{stagger}$ is the staggering duration, SIFS is the SIFS duration 716, and max $(\text{BA}_{size})$ may be a BA size. In some examples, the max $(\text{BA}_{size})$ may be predefined or standardized. In some examples, BSSs 706 may negotiate a max ($BA_{size}$). For example, each BSS 706 may announce a BA size, and the APs 702 may determine the maximum BA size from the announced BA sizes. In some examples, the APs 702 may determine the BA sizes based on buffer status reports (BSRs) transmitted by each AP 702.

Each AP 702 may determine the individual PPDU end time for that AP 702 based on the universal PPDU end time, $\tau_{uni}$, and a staggering order. For example, a first ordered AP 702 may determine the end time for its PPDU, $\tau_1$, as $\tau_1=\tau_{uni}$, a second ordered AP 702 may determine the end time for its PPDU, $\tau_2$, as $\tau_2=\tau_{uni}+\tau_{stagger}$, and an nth ordered AP 702 may determine the end time for its PPDU, $\tau_n$, as $\tau_n=\tau_{uni}+(n-1)\tau_{stagger}$. For example, as shown in the timing diagram 700, the AP 702-*a* may be the first ordered AP 702 and thus the end time of the PPDU 712-*a* may be $\tau_{uni}$, the AP 702-*b* may be the second ordered AP and thus the end time of the PPDU 712-*b* may be $\tau_2=\tau_{uni}+\tau_{stagger}$, and the AP 702-*c* may be the third ordered AP and thus the end time of the PPDU 712-*c* may be $\tau_3=\tau_{uni}+(3-1)\tau_{stagger}$. Accordingly, as shown, the AP 702-*b* may include one staggering period 726 after the universal PPDU end time, and the AP 702-*c* may include two staggering periods 726 after the universal PPDU end time.

In some examples, each AP 702 may know, determine, calculate, or select its staggering order to terminate its corresponding PPDU 712 at the correctly ordered time and thus receive a BA 714-*a* at the correct time (for example, at a staggered duration that avoids the false locking issue). In some examples, each AP 702 may determine, calculate, or select its staggering order independently. In some examples, each AP 702 may use the same staggering order formula and inputs to achieve the same universal PPDU end time ($\tau_{uni}$) without explicit signaling between the APs 702. For example, the APs 702 may monitor (for example, continuously monitor) the medium to track how many active APs use the medium (for example, to determine the quantity of overlapping PPDUs 712 which may be the value of N). Thus, given the quantity of APs 702 N that transmit overlapping PPDUs 712 and assuming a default value of the BA size, each AP 702 may determine the value of the universal PPDU end time ($\tau_{uni}$). In some examples, as described herein, the default value of the BA size (for example, the default value of the duration of a BA 714) may be standardized or predefined. In some examples, the size of (for example, duration of) the staggering period 726 may be standardized or predefined. For example, the size of (for example, duration of) the staggering period 726 may be selected to be greater than a false locking period.

In some examples, each AP 702 may randomly select its own staggering order. For example, as each AP 702 may determine the quantity of APs 702 N that transmit overlapping PPDUs 712, each AP 702 may select a random number between 1 and N to use as the staggering order. In such examples, however, BAs 714 may collide as two APs 702 may randomly select the same number and thus may select the same PPDU end time. In some examples, to reduce the BA collision probability, the staggering order values may be randomly selected from a larger range of 1 to N', where N' is greater than N. In such examples, however, the medium utilization may be degraded as the universal end time may be calculated as a function of N', and therefore each BSS 706 may terminate corresponding PPDUs earlier (for example, much earlier) than the beginning of the second transmission period 722 which may be restricted (or the common end time 730 of the first transmission period 720).

In some examples, the staggering order may be based on the BSSID order (for example, the MAC address of the AP 702). For example, each AP 702 may collect the BSSIDs of each AP 702 that is using the first transmission period 720 (for example, that will transmit a PPDU 712 during the first transmission period 720). Each AP 702 may sort the BSSIDs (for example, in ascending order) and may determine, calculate, or select the staggering order based on the order of the BSSIDs, including its own.

In some examples, the staggering order may be based on the beacon order. For example, each AP 702 may transmit a beacon 728 that schedules transmission of a corresponding PPDU 712 in the first transmission period 720. For example, the AP 702-*a* may transmit a beacon 728-*a* that schedules the PPDU 712-*a* (for example, to service the STA 704-*a* and/or one or more other STAs 704 in the BSS 706-*a*), the AP 702-*b* may transmit a beacon 728-*b* that schedules the PPDU 712-*b* (for example, to service the STA 704-*b* and/or one or more other STAs 704 in the BSS 706-*b*), and the AP 702-*c* may transmit a beacon 728-*c* that schedules the PPDU 712-*c* (for example, to service the STA 704-*c* and/or one or more other STAs 704 in the BSS 706-*c*). Each AP 702 may monitor for the beacons transmitted by other APs 702 and may record the temporal order in which the beacons 728 are transmitted. The order in which the beacons 728 are transmitted may correspond (for example, may equal) the PPDU staggering order. For example, the beacon 728-*a* may be transmitted before the beacon 728-*b*, and the beacon 728-*b* may be transmitted before the beacon 728-*c*, and accordingly the PPDU end time staggering order may be: 1) the PPDU 712-*a* transmitted by the AP 702-*a;* 2) the PPDU 712-*b* transmitted by the AP 702-*b*; and 3) the PPDU 712-*c* transmitted by the AP 702-*c*. The staggering order being based on the temporal order of beacon transmissions may be used, for example, as in some cases APs may limit the publicity of MAC addresses and/or may use MAC address randomization. Further, staggering order being based on the temporal order of beacon transmissions may be used, for example, to avoid the same staggering order for each SP in which PPDUs are transmitted by multiple APs 702.

As the universal PPDU end time may be calculated based on a default BA size, there may be cases where the BA 714 of the BSS with the last staggering order may have a BA size greater than the default BA size. In such examples, the BA 714 would be transmitted at least partially during the second transmission period 722. For example, if the BA 714-*c* is greater than the default BA size, the BA 714-*c* could be partially transmitted in the second transmission period 722, which would violate the second transmission period 722 or the common end time 730 of the first transmission period 720. The AP 702-*c* may predict that the BA 714-*c* is larger than the default BA size, however, based on the size of the PPDU 712-*c*. Accordingly, to avoid violating the second transmission period 722 or the common end time 730 of the first transmission period 720, the AP 702-*c* may back off the end time of the PPDU 712-*c* to before the universal PPDU end time ($\tau_{uni}$) (for example, by a staggering period 726). For example, in the case that the BA 714-*c* is larger than the default BA size such that the BA 714-*c* would leak into the second transmission period 722, the AP 702-*c* may terminate the PPDU 712-*c* at a time $\tau_{uni}-\tau_{stagger}$ (for example, may use a staggering order of 0 instead of 3). Changing the staggering order and thus terminating the PPDU 712-*c* a staggering period 726 before the termination of the PPDU 712-*a* would accordingly cause the BA 714-*c* to be transmitted a staggering period 726 prior to the BA 714-*a*. In some examples, the BA 714 (for example, the BA 714-*b*) of the second to last ordered BSS (for example, the BSS 706-*b*) may be much larger than the default BA size and also may violate the restricted transmission period or the common end time 730 of the first transmission period 720. In such examples, the AP (for example, the AP 702-*b*) of the second to last ordered BSS 706 may change its staggering order to −1 (for example, instead of N−1). For example, if the BA 714-*b* is larger than the default BA size such that the BA 714-*b* would leak into the second transmission period 722, the AP 702-*b* may terminate the PPDU 712-*b* two staggering periods 726 before the universal PPDU end time ($\tau_{uni}$).

Figure 8:
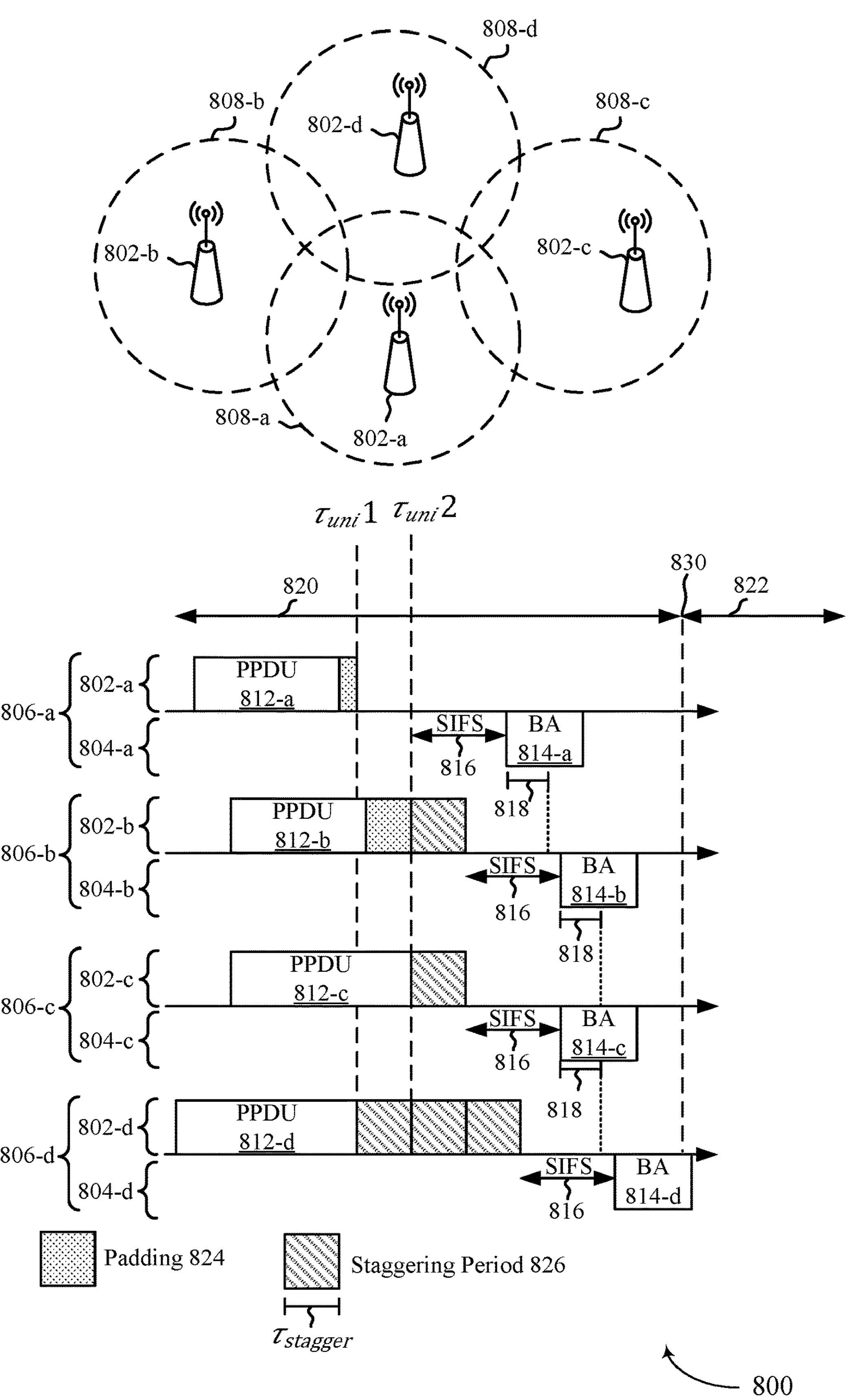
FIG. 8 shows an example of a signaling diagram that supports overlapping PPDU end point offset.

FIG. 8 shows an example of a signaling diagram 800 that supports overlapping PPDU end point offset. The signaling diagram 800 may implement or may be implemented by aspects of the wireless communication network 100, the signaling diagram 500, the timing diagram 600, or the timing diagram 700. For example, the signaling diagram 800 may include an AP 802-*a*, an AP 802-*b*, an AP 802-*c*, and an AP 802-*d*, which may be examples of APs 102 as described with reference to FIG. 1, APs 502 as described with reference to FIG. 5, APs 602 as described with reference to FIG. 6, or APs 702 as described with reference to FIG. 7. The signaling diagram 800 may include a STA 804-*a*, a STA 804-*b*, a STA 804-*c*, and a STA 804-*d* which may be examples of STAs 104 as described with reference to FIG. 1, STAs 504 as described with reference to FIG. 5, STAs 604 as described with reference to FIG. 6, or STAs 704 as described with reference to FIG. 7. The AP 802-*a* and the STA 804-*a* may be associated with a BSS 806-*a*, the AP 802-*b* and the STA 804-*b* may be associated with a BSS 806-*b*, the AP 802-*c* and the STA 804-*c* may be associated with a BSS 806-*c*, and the AP 802-*d* and the STA 804-*d* may be associated with a BSS 806-*d*.

In a first transmission period 820 (for example, an SP such as a spatial reuse SP), the APs 802 may transmit overlapping PPDUs 812. For example, the AP 802-*a* may transmit a PPDU 812-*a*, and in response the STA 804-*a* may transmit a BA 814-*a* a SIFS duration 816 after the end of the PPDU 812-*a*. The AP 802-*b* may transmit a PPDU 812-*b*, and in response the STA 804-*b* may transmit a BA 814-*b* a SIFS duration 816 after the end of the PPDU 812-*b*. The AP 802-*c* may transmit a PPDU 812-*c*, and in response the STA 804-*c* may transmit a BA 814-*c* a SIFS duration 816 after the end of the PPDU 812-*c*. The AP 802-*d* may transmit a PPDU 812-*d*, and in response the STA 804-*c* may transmit a BA 814-*d* a SIFS duration 816 after the end of the PPDU 812-*d*. There may be a common end time 830 for the first transmission period 820 for the BSS 806-*a*, the BSS 806-*b*, the BSS 806-*c*, and the BSS 806-*d*. For example, the first transmission period 820 may be followed by a second transmission period 822 that may be restricted. For example, one of the APs 802 may announce a reservation of the second transmission period 822 (for example, as a CrTWT SP). Thus, transmission of the BAs 814 may each be completed prior to the start of the second transmission period 822.

The APs 802 may stagger the end times of the overlapping PPDUs 812 to overcome false locking periods 818 for BAs 814 as described herein. In some examples, as shown in the signaling diagram, however, two APs 802 may be hidden from each other. For example, the coverage area 808-*a* of the AP 802-*a* may overlap with the coverage area 808-*b* of the AP 802-*b*, the coverage area 808-*c* of the AP 802-*c*, and the coverage area 808-*d* of the AP 802-*d*. Similarly, the coverage area of the AP 802-*d* may overlap with the coverage area 808-*b* of the AP 802-*b*, the coverage area 808-*c* of the AP 802-*c*, and the coverage area 808-*a* of the AP 802-*a*. The coverage area 808-*b* of the AP 802-*b*, however, may not overlap with the coverage area 808-*c* of the AP 802-*c*. Accordingly, based on monitoring the medium, the AP 802-*a* and the AP 802-*d* would determine that N=4 (for example, four APs 802 transmit overlapping PPDUs 812 during the first transmission period 820), while the AP 802-*b* and the AP 802-*c* would determine that N=3 (for example, three APs 802 transmit overlapping PPDUs 812 during the first transmission period 820). In such examples, the APs 802 may calculate different universal end times ($\tau_{uni}$ 1 for the AP 802-*a* and the AP 802-*d* and $\tau_{uni}$ 2 for the AP 802-*b* and the AP 802-*c*) and different staggering orders based on the perceived different number of APs 802 using the medium during the first transmission period 820. In some examples, as shown in the signaling diagram 800, PPDU end time staggering may be immune to the hidden AP issue.

For example, as shown in the signaling diagram 800, the staggering order determined by the AP 802-*a* and the AP 802-*d* is: the AP 802-*a*, the AP 802-*b*, the AP 802-*c*, the AP 802-*d*. The AP 802-*a* may add padding 824 to the PPDU 812-*a* to terminate the PPDU 812-*a* at the calculated universal end time $\tau_{uni}$ 1. The staggering order determined by the AP 802-*b* is: the AP 802-*a*, the AP 802-*b*, the AP 802-*d*. The AP 802-*b* may add padding 824 to the PPDU 812-*b* based on universal end time $\tau_{uni}$ 2 and may add one staggering period 826 based on determining that the AP 802-*b* is the second AP 802 in the staggering order. The staggering order determined by the AP 802-*c* is: the AP 802-*a*, the AP 802-*c*, the AP 802-*d*. The AP 802-*c* may add one staggering period 826 to the universal end time $\tau_{uni}$ 2 based on determining that the AP 802-*c* is the second AP 802 in the staggering order. The AP 802-*d* may add three staggering periods 826 to the universal end time $\tau_{uni}$ 1 based on determining that the AP 802-*d* is the fourth AP 802 in the staggering order. As shown in the signaling diagram 800, $\tau_{uni}$ 2=$\tau_{uni}$ 1+$\tau_{stagger}$. The BAs 814-*b* and 814-*c* overlap in time, but as the AP 802-*b* is outside the coverage area 808-*c* and the AP 802-*c* is outside the coverage area 808-*b*, the BA 814-*b* is not received by the AP 802-*c* and the BA 814-*c* is not received by the AP 802-*b*, and thus the BA 814-*b* does not cause a false locking problem at the AP 802-*c* and the BA 814-*c* does not cause a false locking problem at the AP 802-*b*.

In examples where the non-overlapping APs 802 do not select the same staggering order, however, a false locking issue may occur. For example, if the staggering order determined by the AP 802-*a* is: the AP 802-*b*, the AP 802-*a*, the AP 802-*d*, the AP 802-*c*; the staggering order determined by the AP 802-*b* is: the AP 802-*b*, the AP 802-*a*, the AP 802-*d*; the staggering order determined by the AP 802-*c* is: the AP 802-*a*, the AP 802-*d*, the AP 802-*c*; and the staggering order determined by the AP 802-*d* is: the AP 802-*b*, the AP 802-*a*, the AP 802-*d*, the AP 802-*c*, the BA 814-*b* and the BA 814-*a* may be transmitted at the same time and may cause a false locking issue.

Figure 9:
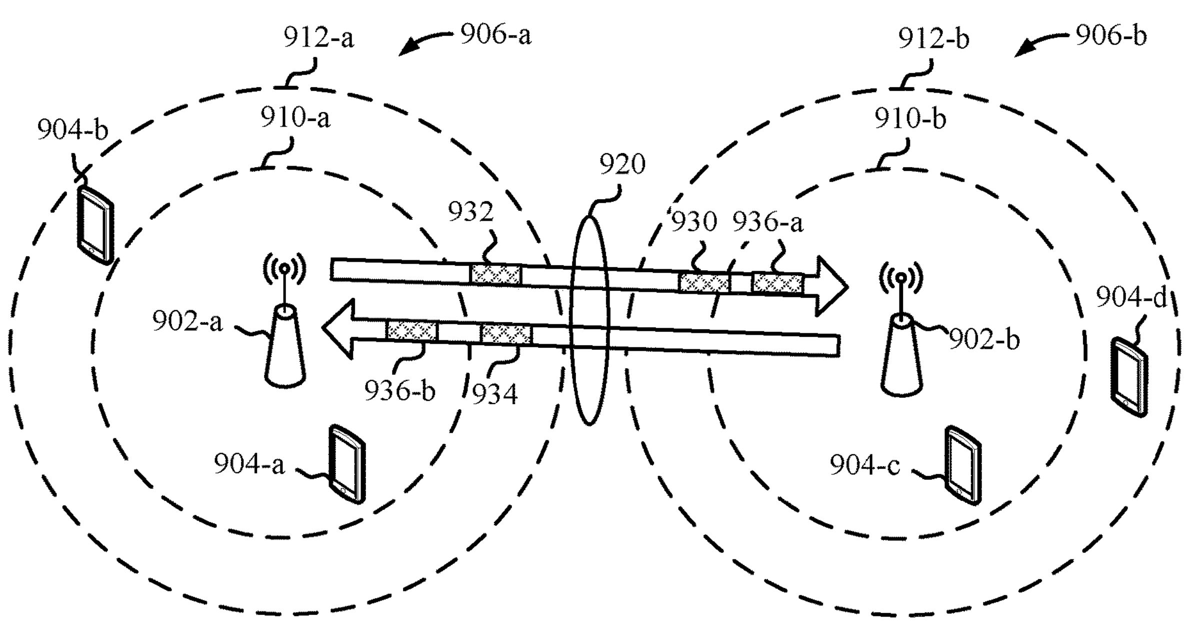
FIG. 9 shows an example of a signaling diagram that supports overlapping PPDU end point offset.
Figure 9:
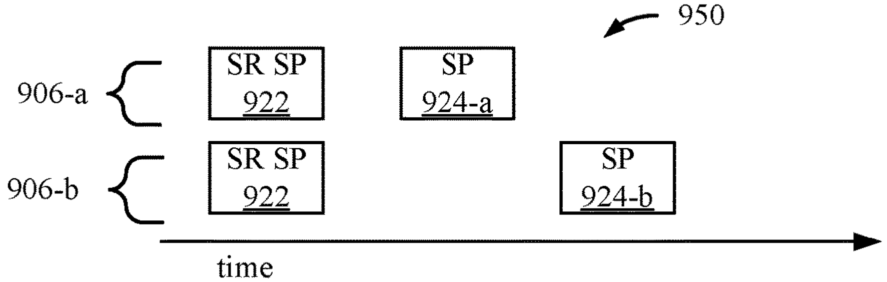

FIG. 9 shows an example of a signaling diagram 900 that supports overlapping PPDU end point offset. The signaling diagram 900 may implement or may be implemented by aspects of the wireless communication network 100, the signaling diagram 500, the timing diagram 600, the timing diagram 700, or the signaling diagram 800. For example, the signaling diagram 900 may include an AP 902-*a* and an AP 902-*b*, which may be examples of APs 102 as described with reference to FIG. 1, APs 502 as described with reference to FIG. 5, APs 602 as described with reference to FIG. 6, APs 702 as described with reference to FIG. 7, or APs 802 as described with reference to FIG. 8. The signaling diagram

900 may include a STA 904-*a*, a STA 904-*b*, a STA 904-*c*, and a STA 904-*d* which may be examples of STAs 104 as described with reference to FIG. 1, STAs 504 as described with reference to FIG. 5, STAs 604 as described with reference to FIG. 6, STAs 704 as described with reference to FIG. 7, or STAs 804 as described with reference to FIG. 8. The AP 902-*a*, the STA 904-*a*, and the STA 904-*b* may be associated with a BSS 906-*a*, and the AP 902-*b*, the STA 904-*c*, and the STA 904-*d* may be associated with a BSS 906-*b*. The AP 902-*a* may communicate with the AP 902-*b* via a wireless communication link 920.

The AP 902-*a* and the AP 902-*b* may implement coordinated spatial reuse (CSR) techniques. For example, the AP 902-*a* may transmit a control message 930 that indicates that a first SP 922 may be shared. Accordingly, the AP 902-*a* may be a sharing AP for the first SP 922. The AP 902-*a* may transmit a control message 932 that reserves an individual SP 924-*a* (for example, an individual SP that is not shared). The AP 902-*b* may transmit a control message 934 that reserves an individual SP 924-*b* (for example, an individual SP that is not shared). CSR may allow an AP (for example, the AP 902-*a*) that owns an SP on a medium to share the SP with other APs seeking system capacity increase. The AP 902 that owns the SP may be referred to as the sharing AP and the other APs may be referred to as shared APs. For example, for the first SP 922, the AP 902-*a* may be referred to as the sharing AP and the AP 902-*b* may be referred to as the shared AP. The sharing AP may determine whether to share an SP based on channel measurements and/or smart STA scheduling. For example, an AP may determine to share an SP in low interference scenarios and may determine not to share an SP in high interference scenarios. For example, interference thresholds may be based on received signal strength indicator (RSSI) measurements on the medium.

In some examples, clear channel assessment (CCA) rules may define the energy detection threshold above which any detected power upon sensing the medium means a busy medium and correspondingly transmission may be deferred. CSR may regulate medium access in cases when the received signal power is below the energy detection threshold. In CSR, the sharing AP may determine to share the medium in low interference scenarios or determine not to share the medium in high interference scenarios. The interference level thresholds may be determined and/or announced by the sharing AP.

The first SP 922 may be referred to as a spatial reuse SP, and the SPs 924 may be referred to as individual SPs or orthogonal SPs. Each AP 902 may classify client devices (for example, STAs) as inner or outer clients. For example, the STA 904-*a* may be an inner client of the AP 902-*a* and the STA 904-*b* may be an outer client of the AP 902-*a*. The STA 904-*c* may be an inner client of the AP 902-*b* and the STA 904-*d* may be an outer client of the AP 902-*b*. Inner clients may be clients that experience low interference from other BSSs 906 (for example, due to closer physical proximity to the serving AP 902) and outer clients may be clients that experience higher interference from other BSSs 906 (for example, due to farther physical proximity to the serving AP 902). For example, the inner clients of the AP 902-*a* may be within an inner coverage zone 910-*a* and the outer clients of the AP 902-*a* may be within an outer coverage zone 912-*a*. The inner clients of the AP 902-*b* may be within an inner coverage zone 910-*b* and the outer clients of the AP 902-*b* may be within an outer coverage zone 912-*b*. For example, the APs 902 and the STAs 904 may exchange reference signals, and the APs 902 may classify the STAs 904 as inner or outer clients based on RSSI measurements of the reference signals. The APs 902 may serve (for example, communicate with) inner clients during spatial reuse SPs and may serve (for example, communicate with) outer clients during individual SPs and may serve. For example, as shown in the timing diagram 950, the AP 902-*a* may serve the STA 904-*a* during the first SP 922 and the AP 902-*b* may serve the STA 904-*c* during the first SP 922. The AP 902-*a* may serve the STA 904-*b* during the individual SP 924-*a*, and the AP 902-*b* may serve the STA 904-*d* during the individual SP 924-*b*.

In some examples, the first SP 922 may be a first transmission period 720 as described with reference to FIG. 7, and the individual SP 924-*a* may be a second transmission period 722 as described with reference to FIG. 7. In such examples, where the spatial reuse SP is followed by a restricted SP (for example, a CrTWT based SP), all APs using the first transmission period 720 (for example, the first transmission period 720 may be a spatial reuse SP) must truncate PPDUs to terminate before the beginning of the individual SP 924-*a*. Such truncation should account for the SIFs duration and the BA duration as described with reference to FIG. 7 such that the BA 714 is received fully within the first SP 922. In CSR, the sharing AP may control the other APs 902. Accordingly, in CSR, the sharing AP (for example, the AP 902-*a*) may share information about the universal end time ($\tau_{uni}$) and the staggering order of each of the shared APs 902.

For example, the control message 930 may indicate the universal end time ($\tau_{uni}$) and the staggering order of each of the shared APs 902 for PPDUs transmitted during the first SP 922. In some examples, the sharing AP (for example, the AP 902-*a*) may choose to be the last terminated PPDU, ensuring that the owner of the SP receives the maximum benefit of the SP (for example, has the longest medium access time in the SP that the sharing AP owns). In some examples, however, the sharing AP may have less data to communicate (for example, may have a shorted PPDU) than other APs transmitting in the first SP 922.

In some examples, the sharing AP may monitor for BSRs 936 transmitted by other APs 902. For example, the AP 902-*a* may transmit a BSR 936-*a* and the AP 902-*b* may transmit a BSR 936-*b*. The sharing AP (for example, the AP 902-*a*) may determine the staggering order based on the buffer sizes indicated by the BSRs (for example, the AP 902 with the largest buffer size may receive the latest staggering order to provide more medium access time), which may provide more efficient SP utilization. Such an approach may not provide extra privilege to the owner of the first SP 922. The exact BA size of each of the shared APs may not be available to the sharing AP, however, in CSR operation, the sharing AP may have knowledge as to the buffer statuses of the shared APs (for example, based on the BSRs 936). The sharing AP may use the size of the buffers to estimate the BA sizes.

In some examples, the sharing AP (for example, the AP 902-*a*) may calculate the PPDU end time for each of the shared APs and the control message 930 may indicate the PPDU end time for each of the shared APs. For example, in FIG. 7, if the AP 702-*a* is the sharing AP, the AP 702-*a* may indicate in the control message 930 the end time of the PPDU 712-*b* for the AP 702-*b* and the end time of the PPDU 712-*c* for the AP 702-*c*. In some examples, the sharing AP (for example, the AP 902-*a*) may calculate the universal end time end time ($\tau_{uni}$) and may indicate in the control message 930 the universal end time end time and the staggering order of each of the shared APs 902. For example, in FIG. 7, if the AP 702-*a* is the sharing AP, the AP 702-*a* may indicate in the control message 930 the universal end time end time ($\tau_{uni}$) and that the AP 702-*a* is the first ordered AP, the AP 702-*b* is the second ordered AP, and the AP 702-*c* is the third ordered AP. Each AP may then use the shared information to determine its own PPDU end time. Accordingly, for CSR, the sharing AP may share information to coordinate PPDU end time staggering. In CSR, a hidden AP problem may not occur even if one shared AP is hidden from another shared AP as the sharing AP indicates the PPDU end time staggering information to each other AP that shares the spatial reuse SP.

Figure 10:
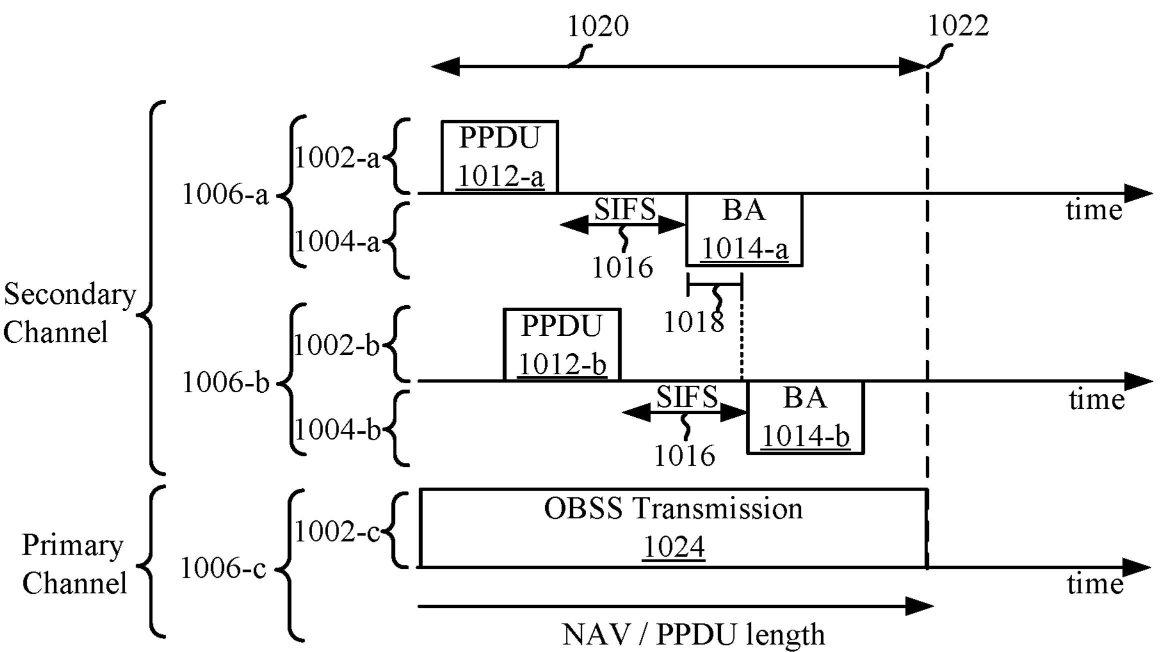
FIG. 10 shows an example of a timing diagram that supports overlapping PPDU end point offset.

FIG. 10 shows an example of a timing diagram 1000 that supports overlapping PPDU end point offset. The timing diagram 1000 may implement or may be implemented by aspects of the wireless communication network 100, the signaling diagram 500, the timing diagram 600, the timing diagram 700, the signaling diagram 800, or the signaling diagram 900. For example, the timing diagram 1000 may include an AP 1002-*a*, an AP 1002-*b*, and an AP 1002-*c* which may be examples of APs 102 as described with reference to FIG. 1, APs 502 as described with reference to FIG. 5, APs 602 as described with reference to FIG. 6, APs 702 as described with reference to FIG. 7, APs 802 as described with reference to FIG. 8, or APs 902 as described with reference to FIG. 9. The timing diagram 1000 may include a STA 1004-*a* and a STA 1004-*b*, which may be examples of STAs 104 as described with reference to FIG. 1, STAs 504 as described with reference to FIG. 5, STAs 604 as described with reference to FIG. 6, STAs 704 as described with reference to FIG. 7, STAs 804 as described with reference to FIG. 8, or STAs 904 as described with reference to FIG. 9. The AP 1002-*a* and the STA 1004-*a* may be associated with a BSS 1006-*a*, the AP 1002-*b* and the STA 1004-*b* may be associated with a BSS 1006-*b*, and the AP 1002-*c* may be associated with a BSS 1006-*c*.

False locking may occur in Non-Primary Channel Access (NPCA) scenarios. NPCA may be a mechanism where different Wi-Fi devices attempt to access a medium on a secondary channel when an OBSS transmission 1024 occurs on a primary channel. Before switching to the secondary channel, the devices (for example, the AP 1002-*a* and the AP 1002-*b*) may record the length for which the primary channel will be busy (for example, the NAV or PPDU length for the OBSS transmission 1024). Once the OBSS transmission 1024 is complete, at time 1022, the devices that switched to the secondary channel terminate transmissions on the secondary channel and switch operation back to the primary channel. Accordingly, devices that switch to a secondary channel may determine, calculate, or select PPDU 1012 end times to avoid false locking for corresponding BAs 1014. For example, in the transmission period 1020 on the secondary channel, the AP 1002-*a* may transmit a PPDU 1012-*a*, and in response the STA 1004-*a* may transmit a BA 1014-*a* a SIFS duration 1016 after the end of the PPDU 1012-*a*. The AP 1002-*b* may transmit a PPDU 1012-*b*, and in response the STA 1004-*b* may transmit a BA 1014-*b* a SIFS duration 1016 after the end of the PPDU 1012-*b*. As shown in the timing diagram 1000, the APs 1002 may implement PPDU end time staggering to avoid missing BAs 1014 due to false locking. For example, the duration between the start of the BA 1014-*a* and the start of the BA 1014-*b* is greater than the false locking period 1018, and thus the AP 1002-*b* may recover from false locking and may receive the BA 1014-*b* prior to transition back to operation on primary channel at time 1022.

Figure 11:
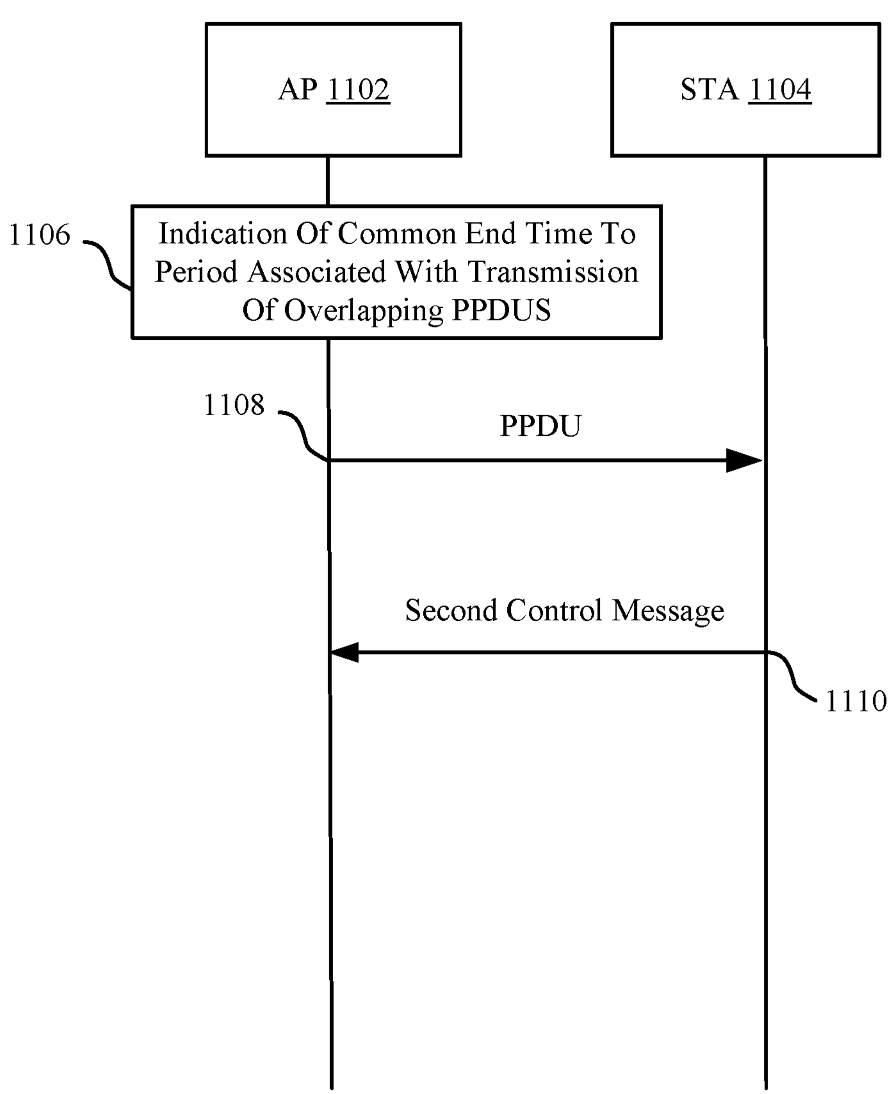
FIG. 11 shows an example of a process flow that supports overlapping PPDU end point offset.

FIG. 11 shows an example of a process flow 1100 that supports overlapping PPDU end point offset. The process flow 1100 may include an AP 1102, which may be an example of an AP 102 as described with reference to FIG. 1, an AP 502 as described with reference to FIG. 5, an AP 602 as described with reference to FIG. 6, an AP 702 as described with reference to FIG. 7, an AP 802 as described with reference to FIG. 8, an AP 902 as described with reference to FIG. 9, or an AP 1002 as described with reference to FIG. 10. The process flow 1100 may include a STA 1104, which may be an example of a STA 104 as described with reference to FIG. 1, a STA 504 as described with reference to FIG. 5, a STA 604 as described with reference to FIG. 6, a STA 704 as described with reference to FIG. 7, a STA 804 as described with reference to FIG. 8, a STA 904 as described with reference to FIG. 9, or a STA 1004 as described with reference to FIG. 10. In the following description of the process flow 1100, the operations between the AP 1102 and the STA 1104 may be transmitted in a different order than the example order shown, or the operations performed by the AP 1102 and the STA 1104 may be performed in different orders or at different times. Some operations also may be omitted from the process flow 1100, and other operations may be added to the process flow 1100.

At 1106, the AP 1102 may obtain or receive an indication of a common time to end a transmission period associated with communication of PPDUs. For example, the AP 1102 may receive an indication of the common time from another AP (e.g., another AP may announce a beginning of a CrTWT SP). As another example, the AP 1102 may obtain the indication of the common time based on determining a time to switch to a primary band as part an NPCA procedure based on a NAV or PPDU length of a device transmitting on the primary band. As another example, the AP 1102 may be the AP that announces the beginning of a CrTWT and accordingly may obtain the indication of the common time based on determining the beginning of the CrTWT SP.

At 1108, the AP 1102 may output or transmit, to the STA 1104, a first PPDU during the transmission period. The first PPDU may at least partially overlap in time with one or more second PPDUs communicated during the transmission period. An end time of the first PPDU is different from respective one or more end times of the one or more second PPDUs. The end time is based on one or more offsets associated with the one or more second PPDUs and the common time. For example, the offsets may be staggering periods as described herein.

At 1110, the AP 1102 may obtain or receive, from the STA 1104, after the end time and prior to the common time, an ACK message (for example, a BA) responsive to the first PPDU.

In some examples, the end time and the respective one or more end times are based on a first end time, one of the end time and the respective one or more end times is the first end time, and the first end time is based on a total quantity of overlapping PPDUs communicated during the transmission period, the total quantity of overlapping PPDUs including the first PPDU and the one or more second PPDUs. In some examples, the AP 1102 may calculate the first end time using a SIFS and one of a maximum ACK message size, an average ACK message size, and a mode ACK message size. In some examples, the AP 1102 may receive or obtain an indication of the total quantity of overlapping PPDUs. In some examples, the AP 1102 may receive or obtain respective identifiers associated with respective devices (for example, BSSIDs or MAC addresses) that communicate the one or more second PPDUs, and the AP 1102 may select the end time from a candidate set of end times that includes the first end time and one or more end times, the selection being based on an order of the respective identifiers. In some examples, the AP 1102 may select the end time randomly from a candidate set of end times including the first end time and one or more end times. In some examples, the AP 1102 may output a first beacon scheduling the first PPDU, and the AP 1102 may receive one or more respective second beacons from one or more other APs scheduling the one or more second PPDUs. The AP 1102 may select the end time from a candidate set of end times including the first end time and one or more end times, the selection being based on a temporal order of transmission of the first beacon and the one or more respective second beacons. In some examples, the end time is an offset before the first end time and is based on the first PPDU being a last ordered PPDU from among the first PPDU and the one or more second PPDUs. For example, the AP 1102 may determine that the ACK message would extend beyond the common time based on the duration of the ACK message (for example, being larger than a default ACK message size used to determine the offset sizes) and the PPDU being a last ordered PPDU.

In some examples, the AP 1102 may transmit or may receive, prior to transmitting the first PPDU, a control message that indicates that the transmission period is designated for spatial reuse, where the one or more second PPDUs are communicated during the transmission period based on the control message. In some examples, the control message indicates the end time and the respective one or more end times. In some examples, the control message includes an indication of a first end time and an indication of an ordering of the end time and the respective one or more end times, the first end time is one of the end time and the respective one or more end times, and the one or more offsets are based on the first end time. In some examples, the AP 1102 may transmit the control message and the end time may be after the respective one or more end times. For example, the AP 1102 may be the sharing AP and may ensure that the AP 1102 has the longest medium access time.

In some examples, the AP 1102 may receive BSRs associated with one or more wireless nodes (for example, other APs) that communicate the one or more second PPDUs, and the end time and the respective one or more end times are based on the BSRs.

In some examples, the AP 1102 may obtain, after the end time and prior to obtaining the ACK message, a second ACK message, where obtaining the ACK message is based on a field in the second ACK message including an indication that the second ACK message is responsive to one of the one or more second PPDUs, and where the ACK message includes an indication that the ACK message is responsive to the first PPDU.

In some examples, the first PPDU may include a trigger field indicating a duration between the end time and a start time of the ACK message.

In some examples, the first PPDU may include a field indicating a duration for transmission of the ACK message. For example, the first PPDU may include a single response scheduling (SRS) field indicating the duration of the BA that corresponds to the PPDU.

In some examples, the AP 1102 may implement NPCA. For example, the AP 1102 may transition for a duration from operating via a first radio frequency band to operating via a second radio frequency band, where the common time corresponds to an end of the duration, where the first PPDU and the one or more second PPDUs are communicated via the second radio frequency band, and where the ACK message is communicated via the second radio frequency band.

In some examples, the indication of the common time may be an indication of a start time of a restricted SP (for example, a CrTWT SP).

In some examples, the wireless communication device that obtains or receive an indication of a common time to end a transmission period associated with communication of PPDUs at 1106, outputs or transmits the PPDU at 1108, and receives an ACK message at 1108 may be a non-AP such as a STA. For example, at 1106 the non-AP device may obtain or receive an indication of a common time to end a transmission period associated with communication of PPDUs. At 1108, the non-AP device may output or transmit, to another device such as an AP or a STA, a first PPDU during the transmission period, where first PPDU may at least partially overlap in time with one or more second PPDUs communicated during the transmission period by other devices, an end time of the first PPDU is different from respective one or more end times of the one or more second PPDUs, and the end time is based on one or more offsets associated with the one or more second PPDUs and the common time. At 1110, the non-AP device may obtain or receive, after the end time and prior to the common time, an ACK message responsive to the first PPDU. In such examples, the non-AP device may perform similar operations as the AP 1102 as described with reference to FIG. 11.

Figure 12:
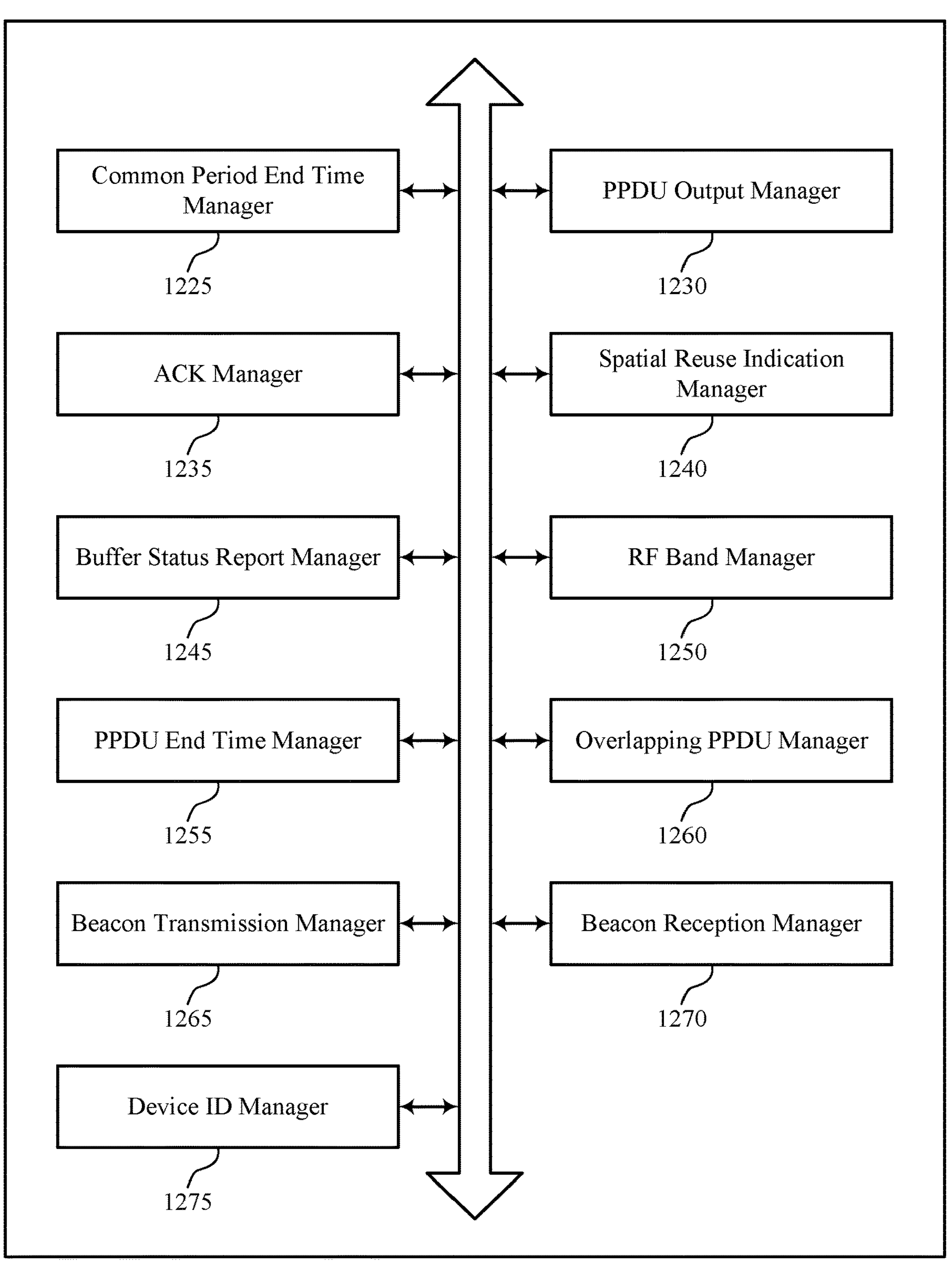
FIG. 12 shows a block diagram of an example wireless communication device that supports overlapping PPDU end point offset.

FIG. 12 shows a block diagram of an example wireless communication device 1200 that supports overlapping PPDU end point offset. In some examples, the wireless communication device 1200 is configured to perform the process 1300 described with reference to FIG. 13. The wireless communication device 1200 may include one or more chips, SoCs, chipsets, packages, components or devices that individually or collectively constitute or include a processing system. The processing system may interface with other components of the wireless communication device 1200, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1200 may transmit the information output from the chip. In such an example, the second interface may refer to an interface between the processing system of the chip and a reception component, such that the wireless communication device 1200 may receive information that is then passed to the processing system. In some such examples, the first interface also may obtain information, such as from the transmission component, and the second interface also may output information, such as to the reception component.

Further, various components of the wireless communication device 1200 may provide means for performing the methods described herein. In some examples, means for transmitting and/or receiving may include the transceivers and/or antenna(s) of the wireless communication device 1200. In some examples, means for outputting or sending (such as means for outputting for transmission) and means for obtaining (such as means for obtaining after information is received from a different device) may include one or more interfaces of the wireless communication device 1200 to output signals to other components or obtain signals from other components of the wireless communication device 1200. For example, a processor (of a processing system)

may output (such as provide) signals and/or data, via a bus interface, to a radio frequency front end for transmission. Similarly, rather than actually receiving signals and/or data, a device may have an interface to obtain the signals and/or data received from another device (a means for obtaining). For example, a processor (of a processing system) may obtain (or receive) the signals and/or data, via a bus interface, from a radio frequency front end for reception. In various aspects, a radio frequency front end may include various components, including transmit and receive processors, transmit and receive MIMO processors, modulators, demodulators, and the like. Each of means for calculating, means for selecting, and/or means for transitioning, include a processing system, processor circuitry (including one or more processors), memory circuitry, and/or computer-readable media of the wireless communication device 1200.

The processing system of the wireless communication device 1200 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1200 can be configurable or configured for use in an AP, such as the AP 102 described with reference to FIG. 1. In some other examples, the wireless communication device 1200 can be an AP that includes such a processing system and other components including multiple antennas. The wireless communication device 1200 is capable of transmitting and receiving wireless communications in the form of, for example, wireless packets. For example, the wireless communication device 1200 can be configurable or configured to transmit and receive packets in the form of physical layer PPDUs and MPDUs conforming to one or more of the IEEE 802.11 family of wireless communication protocol standards. In some other examples, the wireless communication device 1200 can be configurable or configured to transmit and receive signals and communications conforming to one or more 3GPP specifications including those for 5G NR or 6G. In some examples, the wireless communication device 1200 also includes or can be coupled with one or more application processors which may be further coupled with one or more other memories. In some examples, the wireless communication device 1200 further includes at least one external network interface coupled with the processing system that enables communication with a core network or backhaul network that enables the wireless communication device 1200 to gain access to external networks including the Internet.

The wireless communication device 1200 includes a common period end time manager 1225, a PPDU output manager 1230, an ACK manager 1235, a spatial reuse indication manager 1240, a BSR manager 1245, an RF band manager 1250, a PPDU end time manager 1255, an overlapping PPDU manager 1260, a beacon transmission manager 1265, a beacon reception manager 1270, and a device ID manager 1275. Portions of one or more of the common period end time manager 1225, the PPDU output manager 1230, the ACK manager 1235, the spatial reuse indication manager 1240, the BSR manager 1245, the RF band manager 1250, the PPDU end time manager 1255, the overlapping PPDU manager 1260, the beacon transmission manager 1265, the beacon reception manager 1270, and the device ID manager 1275 may be implemented at least in part in hardware or firmware. For example, one or more of the common period end time manager 1225, the PPDU output manager 1230, the ACK manager 1235, the spatial reuse indication manager 1240, the BSR manager 1245, the RF band manager 1250, the PPDU end time manager 1255, the overlapping PPDU manager 1260, the beacon transmission manager 1265, the beacon reception manager 1270, and the device ID manager 1275 may be implemented at least in part by at least a processor or a modem. In some examples, portions of one or more of the common period end time manager 1225, the PPDU output manager 1230, the ACK manager 1235, the spatial reuse indication manager 1240, the BSR manager 1245, the RF band manager 1250, the PPDU end time manager 1255, the overlapping PPDU manager 1260, the beacon transmission manager 1265, the beacon reception manager 1270, and the device ID manager 1275 may be implemented at least in part by a processor and software in the form of processor-executable code stored in memory.

The wireless communication device 1200 may support wireless communications in accordance with examples as disclosed herein. The common period end time manager 1225 is configurable or configured to obtain an indication of a common time to end a transmission period associated with communication of PPDUs. The PPDU output manager 1230 is configurable or configured to output a first PPDU during the transmission period, where the first PPDU at least partially overlaps in time with one or more second PPDUs communicated during the transmission period, where an end time of the first PPDU is different from respective one or more end times of the one or more second PPDUs, and where the end time is based on one or more offsets associated with the one or more second PPDUs and the common time. The ACK manager 1235 is configurable or configured to obtain, after the end time and prior to the common time, an ACK message responsive to the first PPDU.

In some examples, the end time and the respective one or more end times are based on a first end time. In some examples, one of the end time and the respective one or more end times is the first end time. In some examples, the first end time is based on a total quantity of overlapping PPDUs communicated during the transmission period, the total quantity of overlapping PPDUs including the first PPDU and the one or more second PPDUs.

In some examples, the PPDU end time manager 1255 is configurable or configured to calculate the first end time using a SIFS and of a maximum ACK message size, an average ACK message size, and a mode ACK message size.

In some examples, the overlapping PPDU manager 1260 is configurable or configured to obtain an indication of the total quantity of overlapping PPDUs.

In some examples, the device ID manager 1275 is configurable or configured to obtain respective identifiers associated with respective devices that communicate the one or more second PPDUs. In some examples, the PPDU end time manager 1255 is configurable or configured to select the end time from a candidate set of end times that includes the first end time and one or more end times, said selection being based on an order of the respective identifiers.

In some examples, the PPDU end time manager 1255 is configurable or configured to select the end time randomly from a candidate set of end times including the first end time and one or more end times.

In some examples, the beacon transmission manager 1265 is configurable or configured to output a first beacon scheduling the first PPDU. In some examples, the beacon reception manager 1270 is configurable or configured to obtain one or more respective second beacons scheduling the one or more second PPDUs. In some examples, the PPDU end time manager 1255 is configurable or configured to select the end time from a candidate set of end times including the first end time and one or more end times, said selection being based on a temporal order of transmission of the first beacon and the one or more respective second beacons.

In some examples, the end time is an offset before the first end time and is based on the first PPDU being a last ordered PPDU from among the first PPDU and the one or more second PPDUs.

In some examples, the spatial reuse indication manager 1240 is configurable or configured to output or obtain, prior to outputting the first PPDU, a control message that indicates that the transmission period is designated for spatial reuse, where the one or more second PPDUs are communicated during the transmission period based on the control message.

In some examples, the control message includes an indication of the end time and the respective one or more end times.

In some examples, the control message includes an indication of a first end time and an indication of an ordering of the end time and the respective one or more end times. In some examples, the first end time is one of the end time and the respective one or more end times. In some examples, the one or more offsets are based on the first end time.

In some examples, to support outputting or obtaining the control message, the spatial reuse indication manager 1240 is configurable or configured to output the control message, where the end time occurs after the respective one or more end times.

In some examples, the BSR manager 1245 is configurable or configured to obtain BSRs associated with one or more wireless nodes that communicate the one or more second PPDUs, where the end time and the respective one or more end times are based on the BSRs.

In some examples, the ACK manager 1235 is configurable or configured to obtain, after the end time and prior to obtaining the ACK message, a second ACK message, where obtaining the ACK message is based on a field in the second ACK message including an indication that the second ACK message is responsive to one of the one or more second PPDUs, and where the ACK message includes an indication that the ACK message is responsive to the first PPDU.

In some examples, the first PPDU includes a trigger field indicating a duration between the end time and a start time of the ACK message.

In some examples, the first PPDU includes a field indicating a duration for transmission of the ACK message.

In some examples, the RF band manager 1250 is configurable or configured to transition for a duration from operating via a first radio frequency band to operating via a second radio frequency band, where the common time corresponds to an end of the duration, where the first PPDU and the one or more second PPDUs are communicated via the second radio frequency band, and where the ACK message is communicated via the second radio frequency band.

In some examples, the indication of the common time includes an indication of a start time of a restricted SP.

Figure 13:
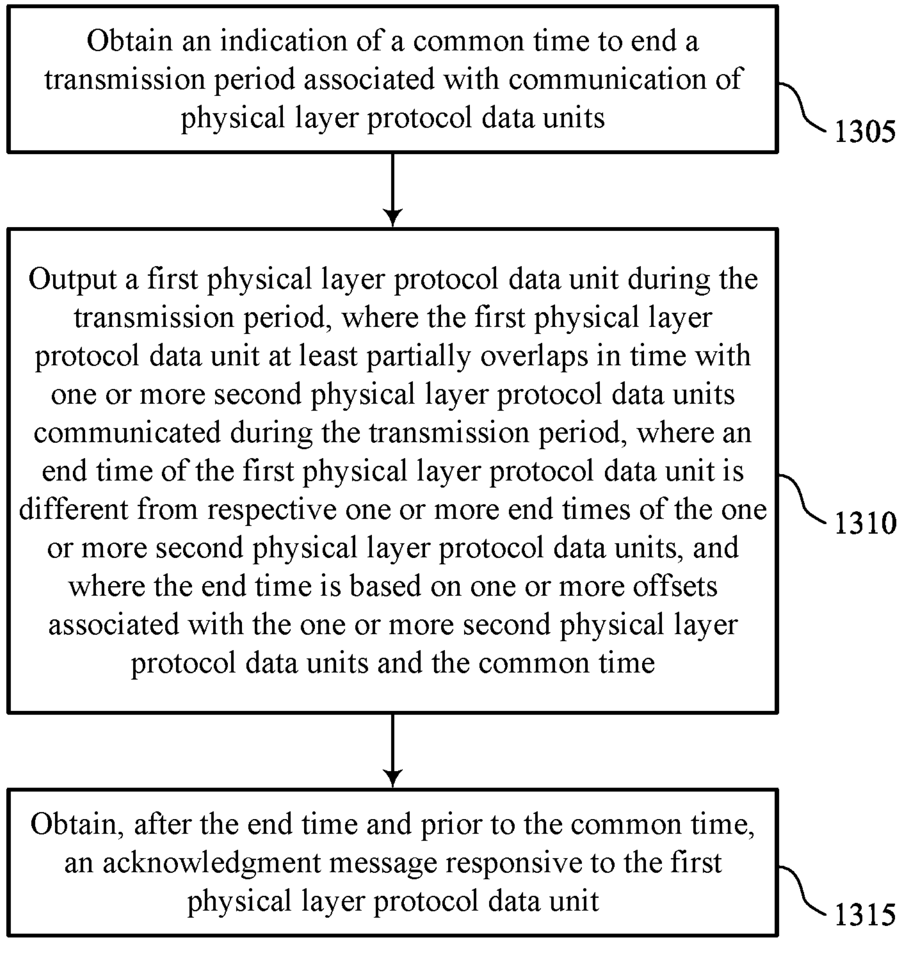
FIG. 13 shows a flowchart illustrating an example process performable by or at a wireless node that supports overlapping PPDU end point offset.

FIG. 13 shows a flowchart illustrating an example process 1300 performable by or at a wireless node that supports overlapping PPDU end point offset. The operations of the process 1300 may be implemented by a wireless node or its components as described herein. For example, the process 1300 may be performed by a wireless communication device, such as the wireless communication device 1200 described with reference to FIG. 12, operating as or within a wireless AP. In some examples, the process 1300 may be performed by a wireless AP, such as one of the APs 102 described with reference to FIG. 1.

In some examples, in 1305, the wireless node may obtain an indication of a common time to end a transmission period associated with communication of PPDUs. The operations of 1305 may be performed in accordance with examples as disclosed herein. In some implementations, aspects of the operations of 1305 may be performed by a common period end time manager 1225 as described with reference to FIG. 12.

In some examples, in 1310, the wireless node may output a first PPDU during the transmission period, where the first PPDU at least partially overlaps in time with one or more second PPDUs communicated during the transmission period, where an end time of the first PPDU is different from respective one or more end times of the one or more second PPDUs, and where the end time is based on one or more offsets associated with the one or more second PPDUs and the common time. The operations of 1310 may be performed in accordance with examples as disclosed herein. In some implementations, aspects of the operations of 1310 may be performed by a PPDU output manager 1230 as described with reference to FIG. 12.

In some examples, in 1315, the wireless node may obtain, after the end time and prior to the common time, an ACK message responsive to the first PPDU. The operations of 1315 may be performed in accordance with examples as disclosed herein. In some implementations, aspects of the operations of 1315 may be performed by an ACK manager 1235 as described with reference to FIG. 12.

Implementation examples are described in the following numbered clauses:

The following provides an overview of aspects of the present disclosure:

Aspect 1: A method for wireless communications at an apparatus, including: obtaining an indication of a common time to end a transmission period associated with communication of PPDUs; outputting a first PPDU during the transmission period, where the first PPDU at least partially overlaps in time with one or more second PPDUs communicated during the transmission period, where an end time of the first PPDU is different from respective one or more end times of the one or more second PPDUs, and where the end time is based on one or more offsets associated with the one or more second PPDUs and the common time; and obtaining, after the end time and prior to the common time, an ACK message responsive to the first PPDU.

Aspect 2: The method of aspect 1, where the end time and the respective one or more end times are based at least in part on a first end time, one of the end time and the respective one or more end times is the first end time, and the first end time is based at least in part on a total quantity of overlapping PPDUs communicated during the transmission period, the total quantity of overlapping PPDUs including the first PPDU and the one or more second PPDUs.

Aspect 3: The method of aspect 2, further including: calculating the first end time using a SIFs and one of a maximum ACK message size, an average ACK message size, and a mode ACK message size.

Aspect 4: The method of any of aspects 2-3, further including: obtaining an indication of the total quantity of overlapping PPDUs.

Aspect 5: The method of any of aspects 2-4, further including: obtaining respective identifiers associated with respective devices that communicate the one or more second PPDUs; and selecting the end time from a candidate set of end times that includes the first end time and one or more end times, said selection being based at least in part on an order of the respective identifiers.

Aspect 6: The method of any of aspects 2-4, further including: selecting the end time randomly from a candidate set of end times including the first end time and one or more end times.

Aspect 7: The method of any of aspects 2-4, further including: outputting a first beacon scheduling the first PPDU; obtaining one or more respective second beacons scheduling the one or more second PPDUs; and selecting the end time from a candidate set of end times including the first end time and one or more end times, said selection being based at least in part on a temporal order of transmission of the first beacon and the one or more respective second beacons.

Aspect 8: The method of any of aspects 2-7, where the end time is an offset before the first end time and is based on the first PPDU being a last ordered PPDU from among the first PPDU and the one or more second PPDUs.

Aspect 9: The method of any of aspects 1-8, further including: outputting or obtaining, prior to outputting the first PPDU, a control message that indicates that the transmission period is designated for spatial reuse, where the one or more second PPDUs are communicated during the transmission period based at least in part on the control message.

Aspect 10: The method of aspect 9, where the control message includes an indication of the end time and the respective one or more end times.

Aspect 11: The method of any of aspects 9-10, where the control message includes an indication of a first end time and an indication of an ordering of the end time and the respective one or more end times, the first end time is one of the end time and the respective one or more end times, and the one or more offsets are based at least in part on the first end time.

Aspect 12: The method of any of aspects 9-11, where outputting or obtaining the control message includes: outputting the control message, where the end time occurs after the respective one or more end times.

Aspect 13: The method of any of aspects 1-12, further including: obtaining buffer status reports associated with one or more wireless nodes that communicate the one or more second PPDUs, where the end time and the respective one or more end times are based at least in part on the buffer status reports.

Aspect 14: The method of any of aspects 1-13, further including: obtaining, after the end time and prior to obtaining the ACK message, a second ACK message, where obtaining the ACK message is based at least in part on a field in the second ACK message including an indication that the second ACK message is responsive to one of the one or more second PPDUs, and where the ACK message includes an indication that the ACK message is responsive to the first PPDU.

Aspect 15: The method of any of aspects 1-14, where the first PPDU includes a trigger field indicating a duration between the end time and a start time of the ACK message.

Aspect 16: The method of any of aspects 1-15, where the first PPDU includes a field indicating a duration for transmission of the ACK message.

Aspect 17: The method of any of aspects 1-8 or 14-16, further including: transitioning for a duration from operating via a first radio frequency band to operating via a second radio frequency band, where the common time corresponds to an end of the duration, where the first PPDU and the one or more second PPDUs are communicated via the second radio frequency band, and where the ACK message is communicated via the second radio frequency band.

Aspect 18: The method of any of aspects 1-17, where the indication of the common time includes an indication of a start time of a restricted SP.

Aspect 19: An apparatus for wireless communications, including one or more memories storing processor-executable code, and one or more processors coupled with the one or more memories and individually or collectively operable to execute the code to cause the apparatus to perform a method of any of aspects 1-18.

Aspect 20: An apparatus for wireless communications, including at least one means for performing a method of any of aspects 1-18.

Aspect 21: A non-transitory computer-readable medium storing code for wireless communications, the code including instructions executable by one or more processors to perform a method of any of aspects 1-18.

Aspect 22: A wireless node, including, at least one transceiver; and a processing system that includes processor circuitry and memory circuitry that stores code, the processing system configured to cause the wireless node to perform a method of any of aspects 1-18, wherein the at least one transceiver is configured to receive the indication and the ACK message and transmit the first PPDU.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. For example, a list of items prefaced by a phrase such as "at least one of" or "one or more of") indicates a disjunctive list such that, for example, a list of "at least one of A, B, or C" means A or B or C or AA or AB or AC or BC or ABC (i.e., A and B and C). Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication, comprising:

at least one transceiver;

one or more memories storing processor-executable code; and one or more processors coupled with the one or more memories and individually or collectively operable to execute the code to cause the apparatus to:

obtain or receive, via the at least one transceiver, an indication of a common time to end a transmission period associated with communication of physical layer protocol data units;

transmit, via the at least one transceiver, a first physical layer protocol data unit during the transmission period, wherein:

the first physical layer protocol data unit at least partially overlaps in time with one or more second physical layer protocol data units communicated during the transmission period, an end time of the first physical layer protocol data unit is different from respective one or more end times of the one or more second physical layer protocol data units, and the end time is based on one or more offsets associated with the one or more second physical layer protocol data units and the common time; and receive, via the at least one transceiver after the end time and prior to the common time, an acknowledgment message responsive to the first physical layer protocol data unit.

2. The apparatus of claim 1, wherein:

the end time and the respective one or more end times are based at least in part on a first end time, one of the end time and the respective one or more end times is the first end time, and the first end time is based at least in part on a total quantity of overlapping physical layer protocol data units communicated during the transmission period, the total quantity of overlapping physical layer protocol data units comprising the first physical layer protocol data unit and the one or more second physical layer protocol data units.

3. The apparatus of claim 2, wherein the one or more processors are individually or collectively further operable to execute the code to cause the apparatus to:

calculate the first end time using a short interframe space and one of a maximum acknowledgment message size, an average acknowledgment message size, and a mode acknowledgment message size.

4. The apparatus of claim 2, wherein the one or more processors are individually or collectively further operable to execute the code to cause the apparatus to:

obtain or receive, via the at least one transceiver, an indication of the total quantity of overlapping physical layer protocol data units.

5. The apparatus of claim 2, wherein the one or more processors are individually or collectively further operable to execute the code to cause the apparatus to:

obtain or receive via the at least one transceiver, respective identifiers associated with respective devices that communicate the one or more second physical layer protocol data units; and select the end time from a candidate set of end times that comprises the first end time and one or more end times, said selection being based at least in part on an order of the respective identifiers.

6. The apparatus of claim 2, wherein the one or more processors are individually or collectively further operable to execute the code to cause the apparatus to:

select the end time randomly from a candidate set of end times comprising the first end time and one or more end times.

7. The apparatus of claim 2, wherein the one or more processors are individually or collectively further operable to execute the code to cause the apparatus to:

transmit, via the at least one transceiver, a first beacon scheduling the first physical layer protocol data unit;

receive, via the at least one transceiver, one or more respective second beacons scheduling the one or more second physical layer protocol data units; and select the end time from a candidate set of end times comprising the first end time and one or more end times, said selection being based at least in part on a temporal order of transmission of the first beacon and the one or more respective second beacons.

8. The apparatus of claim 2, wherein the end time is an offset before the first end time and is based on the first physical layer protocol data unit being a last ordered physical layer protocol data unit from among the first physical layer protocol data unit and the one or more second physical layer protocol data units.

9. The apparatus of claim 1, wherein the one or more processors are individually or collectively further operable to execute the code to cause the apparatus to:

transmit or receive, via the at least one transceiver and prior to transmitting the first physical layer protocol data unit, a control message that indicates that the transmission period is designated for spatial reuse, wherein the one or more second physical layer protocol data units are communicated during the transmission period based at least in part on the control message.

10. The apparatus of claim 9, wherein the control message comprises an indication of the end time and the respective one or more end times.

11. The apparatus of claim 9, wherein:

the control message comprises an indication of a first end time and an indication of an ordering of the end time and the respective one or more end times, the first end time is one of the end time and the respective one or more end times, and the one or more offsets are based at least in part on the first end time.

12. The apparatus of claim 9, wherein, to transmit or receive the control message, the one or more processors are individually or collectively operable to execute the code to cause the apparatus to:

transmit the control message, wherein the end time occurs after the respective one or more end times.

13. The apparatus of claim 1, wherein the one or more processors are individually or collectively further operable to execute the code to cause the apparatus to:

receive, via the at least one transceiver, buffer status reports associated with one or more wireless nodes that communicate the one or more second physical layer protocol data units, wherein the end time and the respective one or more end times are based at least in part on the buffer status reports.

14. The apparatus of claim 1, wherein the one or more processors are individually or collectively further operable to execute the code to cause the apparatus to:

receive, via the at least one transceiver and after the end time and prior to receiving the acknowledgment message, a second acknowledgment message, wherein receiving the acknowledgment message is based at least in part on a field in the second acknowledgment message including an indication that the second acknowledgment message is responsive to one of the one or more second physical layer protocol data units, and wherein the acknowledgment message includes an indication that the acknowledgment message is responsive to the first physical layer protocol data unit.

15. The apparatus of claim 1, wherein the first physical layer protocol data unit comprises a trigger field indicating a duration between the end time and a start time of the acknowledgment message.

16. The apparatus of claim 1, wherein the first physical layer protocol data unit comprises a field indicating a duration for transmission of the acknowledgment message.

17. The apparatus of claim 1, wherein the one or more processors are individually or collectively further operable to execute the code to cause the apparatus to:

transition for a duration from operating via a first radio frequency band to operating via a second radio frequency band, wherein the common time corresponds to an end of the duration, wherein the first physical layer protocol data unit and the one or more second physical layer protocol data units are communicated via the second radio frequency band, and wherein the acknowledgment message is communicated via the second radio frequency band.

18. The apparatus of claim 1, wherein the indication of the common time comprises an indication of a start time of a restricted service period.

19. The apparatus of claim 1, wherein the apparatus is configured to operate as an access point.

20. A method for wireless communications by a wireless node, comprising:

obtaining or receiving an indication of a common time to end a transmission period associated with communication of physical layer protocol data units;

transmitting a first physical layer protocol data unit during the transmission period, wherein:

the first physical layer protocol data unit at least partially overlaps in time with one or more second physical layer protocol data units communicated during the transmission period, an end time of the first physical layer protocol data unit is different from respective one or more end times of the one or more second physical layer protocol data units, and the end time is based on one or more offsets associated with the one or more second physical layer protocol data units and the common time; and receiving, after the end time and prior to the common time, an acknowledgment message responsive to the first physical layer protocol data unit.

* * * * *